(12) United States Patent
Bendejacq et al.

(10) Patent No.: US 8,883,262 B2
(45) Date of Patent: Nov. 11, 2014

(54) MODIFICATION OF SOLID SURFACES BY APPLICATION OF POLYMER ASSOCIATIONS THEREON

(75) Inventors: Denis Bendejacq, Paris (FR); Olivier Anthony, Meriel (FR)

(73) Assignee: Rhodia Operations, Aubervilliers (FR)

( * ) Notice: Subject to any disclaimer, the term of this patent is extended or adjusted under 35 U.S.C. 154(b) by 1269 days.

(21) Appl. No.: 12/281,597

(22) PCT Filed: Mar. 5, 2007

(86) PCT No.: PCT/FR2007/000385
§ 371 (c)(1),
(2), (4) Date: Jun. 19, 2009

(87) PCT Pub. No.: WO2007/099239
PCT Pub. Date: Sep. 7, 2007

(65) Prior Publication Data
US 2009/0306292 A1 Dec. 10, 2009

(30) Foreign Application Priority Data
Mar. 3, 2006 (FR) .................................... 06 01928

(51) Int. Cl.
C08G 73/02 (2006.01)
C08G 79/02 (2006.01)
C08L 81/00 (2006.01)
C08L 101/02 (2006.01)

(52) U.S. Cl.
CPC .................................. *C08L 101/02* (2013.01)
USPC ................... 427/337; 427/407.1; 427/407.2; 427/409; 427/412; 427/412.1; 427/412.3; 427/412.4; 427/412.5

(58) Field of Classification Search
USPC ........ 427/337, 407.1, 407.2, 409, 412, 412.1, 427/412.3, 412.4, 412.5
See application file for complete search history.

(56) References Cited

U.S. PATENT DOCUMENTS

| | | | |
|---|---|---|---|
| 5,712,326 A * | 1/1998 | Jones et al. | 523/105 |
| 6,090,901 A * | 7/2000 | Bowers et al. | 526/277 |
| 6,150,432 A * | 11/2000 | Jones et al. | 523/105 |
| 6,395,800 B1 * | 5/2002 | Jones et al. | 523/105 |
| 6,743,878 B2 * | 6/2004 | Bowers et al. | 526/277 |
| 6,893,595 B1 * | 5/2005 | Muir et al. | 264/255 |
| 6,924,338 B1 * | 8/2005 | Davies et al. | 525/203 |
| 7,160,953 B2 * | 1/2007 | Bowers et al. | 525/326.6 |
| 2003/0083223 A1 | 5/2003 | Aubay et al. | |
| 2006/0183863 A1 * | 8/2006 | Huang et al. | 525/234 |
| 2006/0217286 A1 | 9/2006 | Geoffroy et al. | |

FOREIGN PATENT DOCUMENTS

| | | |
|---|---|---|
| EP | 0875551 A1 | 11/1998 |
| EP | 0875552 A1 | 11/1998 |
| EP | 1594945 | 11/2005 |
| WO | WO 2004/074420 A1 | 9/2004 |
| WO | WO 2004/083354 A1 | 9/2004 |

\* cited by examiner

Primary Examiner — William Phillip Fletcher, III

(57) ABSTRACT

Polymer combinations which contain:
at least one first polymer (PZ) containing zwitterionic structural units; and
at least one other polymer (P) carrying charged substituents and capable of bonding with the at least one first polymer (PZ), are applied onto the face surface(s) of solid materials to modify the surface properties thereof.

19 Claims, 1 Drawing Sheet

MODIFICATION OF SOLID SURFACES BY APPLICATION OF POLYMER ASSOCIATIONS THEREON

CROSS-REFERENCE TO PRIORITY/PCT APPLICATIONS

This application is a national phase of PCT/FR 2007/000385, filed Mar. 5, 2007 and designating the U.S. (published in the French language on Sep. 7, 2007, as WO 2007/099239 A3; the title and abstract were also published in English) and claims priority to FR 0601928, filed Mar. 3, 2006, each hereby expressly incorporated by reference in its entirety and each assigned to the assignee hereof.

The present invention relates to the modification of the surface properties of solid materials, such as plastics material-based, glass-based or metal-based surfaces. More specifically, the invention relates to compositions which modify the hydrophilic properties of said surfaces and/or modify their ability to support and/or retain a deposit of a film-forming or adhesive composition.

There are many industrial fields where it is desirable, and sometimes necessary, to modify particular surface properties of solid materials. Especially, surface treatments of this type are especially used in order to make surfaces compatible with a composition or compounds, for which an untreated material initially has a weak affinity, and this generally improves the efficacy and/or bond of a deposit of said composition on the treated surface. More generally, a surface treatment may also be used to modify the behaviour of a material with regard to a compound, a composition or a medium (for example a liquid medium) which could, for example, be used to increase or, conversely, to reduce the wettability of a solid material with a liquid medium or a liquid composition.

In this respect, surface treatments are known, for example, which modify the hydrophilic properties of specific materials. Especially, methods have been described for increasing the affinity for water of initially hydrophobic materials, such as polyethylene or polypropylene-type polymers, which incorporate surface active or amphiphilic agents in the polymer or a deposit on the surface of such agents which are used, for example, to improve the deposition of aqueous compositions (for example water-based paints).

In contrast, methods have also been described which result in surface-hydrophobisation able, for example, to oppose the deposition of water on surfaces (repellent treatment, for example for producing, especially, waterproof fabrics on which water droplets slide without wetting the fabric).

Other known methods of surface modification make it possible to optimise the deposition of film-forming or adhesive compositions on the treated surface. In this respect, depositing primary layers or amphiphilic polymer-type compounds on the surface upon which it is desired to deposit a film or on the surface to be stuck has been described especially.

In order to obtain surface treatments of this type which are effective, it has generally proven necessary to adapt, on a case-by-case basis, the nature of the means to be used to modify the surface. Thus, for example, effective solutions suggested within the scope of a treatment for modifying the affinity of a surface for water are not systematically transposable with the same efficacy to other types of surface treatment.

In this respect, it should be noted that a recurrent problem with surface treatments is that of their durability over time. More generally, it has been observed that one type of treatment which appears to be suitable for ensuring a durable modification of a given surface property is not necessarily that which is suitable for effectively maintaining, over time, another type of surface modification. Thus, in order to obtain a durable treatment, it is generally necessary to optimise the type of treatment to be carried out for each surface treatment. This optimisation, which is costly in terms of time, has proven to be especially difficult when it is desirable to obtain a durable modification of many surface properties at the same time.

The present invention aims at providing a surface treatment method of the aforementioned type which is especially adaptable, that is to say which makes it possible to comply with a wide range of modifications to surface properties, preferably by ensuring a surface modification which is durable over time.

In this respect, a purpose of the invention is, especially, to provide a method which makes it possible to control the surface properties of a material, especially its hydrophilic properties and/or its capacity to support and/or retain a deposit of a film-forming and/or adhesive composition.

The present invention accordingly proposes using a combination of at least two specific polymers to treat the surface of the solid material of which the properties are to be modified.

More precisely, according to a first feature, the invention relates to the use of a polymer combination which contains:
a first polymer (PZ) containing zwitterionic units; and
another polymer (P), different from the first polymer (PZ) carrying charged groups and able to bond with said first polymer (PZ),
for modifying the surface properties of a solid material.

According to another feature, the invention also relates to a method for treating a surface of a solid material comprising depositing on said surface a composition containing the aforementioned combination of polymers (PZ) and (P), as well as solid materials with a modified surface as obtained from this treatment method.

It should be noted that the combination may contain a plurality of different polymers (P).

"Solid material" means, within the meaning of the present description, a material present in the form of a macroscopic solid as opposed to matter in the form of isolated molecules or aggregates of a plurality of molecules. Thus, the surface properties of a solid obtained according to the invention are modified, especially so as to be set apart from an encapsulation of molecules, such as active ingredients, which are not solids having surface properties within the meaning of the invention.

Consequently, a solid material according to the invention most often takes the form of a solid having dimensions of at least approximately one centimetre and having a surface to be treated of at least a few $cm^2$, even of at least a few tens of $cm^2$ or a few $m^2$. Thus, it may be a mass solid having a volume of approximately one $cm^3$, preferably of at least approximately ten $cm^3$ and, for example at least approximately one hundred $cm^3$. Alternatively, it could be a material comprising fibres, for example in the form of a woven or non-woven fabric-type textile. According to another more particular embodiment, the solid material, of which the surface is treated, may be present in a more divided form, for example in the form of a powder, said powder having, however, a particle-size distribution sufficient for the particles of the powder to have surface properties within the meaning of the invention, that is to say typically a particle-size distribution of at least 1 micron, advantageously of at least 10 microns, and more especially of at least 100 microns.

The chemical nature of the solid material treated according to the invention may vary to a relatively large extent. Thus, generally, the treated solid material may be organic and/or inorganic. More specifically, the method of the invention has proven to be suitable, especially, for treating material comprising a polymer-based surface to be treated (especially a polymer selected from the plastic or thermoplastic polymers, such as polyamides, polycarbonates, polyethylene terephthalate, methyl polymethacrylate, polypropylenes, polyethylenes, polystyrenes, polyesters, acrylonitrile butadiene styrene (ABS) or polyvinyl chlorides, and advantageously a thermoplastic polymer such as polyethylene or polypropylene), or even a glass-based or metal-based surface to be treated (for example selected from aluminium or steels).

The inventors have now shown that the combination of the aforementioned polymers (PZ) and (P) has proven to be especially effective for modifying the surface properties of the majority of solid materials, most often by obtaining a durable modification to the surface properties. Especially, the surface treatment obtained by using the polymer combination of the invention has generally proven to be resistant to washes with water and saline solutions.

In this respect, without wanting to be linked to a particular theory, it seems that the use of polymers PZ with polyzwitterionic units combined with polymers P leads to specific objects which have the possibility of bonding effectively to a large number of solid surfaces. The inventors have, in fact, observed that the combination of polymers (PZ) and (P) forms, in the majority of cases, specific objects known as "coacervates" which generally take the form of particles based on the combination of two polymers dispersed in the solvent medium, generally having dimensions of from 5 to 1,000 nm, typically from 10 to 100 nm, for example from 15 to 50 nm. In an indicative manner, the coacervates obtained with the polymer combinations of the examples given later in the present description are approximately 20 nm. The formation of coacervates of this type generally leads to especially effective modifications to the surface properties. In this respect, the inventors have observed that polymer (PZ) and polymer (P)-based coacervates tend to be deposited homogeneously on the surface of the treated solid, as shown in the attached FIG. 1. A "structured" deposit of this type on the surface of the treated solid seems to explain, at least in part, the especially effective surface modifications obtained according to the invention.

In any case, whatever the form of the combination of polymers (PZ) and (P), it has been found that, when these two combined polymers are deposited on the surface of a solid support, they effectively modify the surface properties of the material and do so in a manner entirely different from that obtained with a deposit of the polymer (PZ) alone or by a deposit of the polymer (P) alone. In general, the deposit of the combination of polymers (PZ) and (P) influences, inter alia, the hydrophilic properties of the surface, the affinity of the surface for film-forming or adhesive compositions, and/or the capacity of the surface to retain a deposit of film-forming or adhesive compositions deposited following treatment with the combination of polymers (PZ) and (P).

The surface modification obtained with the combination of polymers (PZ) and (P) has also proven to be adaptable. In fact, by adapting the nature of the polymers (PZ) and (P), as well as their ratio, the polymer combination of the invention makes it possible to modify, as desired, the properties of a given solid surface, generally by obtaining a modification which is effective and which, more often, is maintained well over time. The invention also provides a general method which is well adapted to modifying surface properties of the majority of solid materials.

The combination of polymers which may be used according to the invention will now be described in greater detail.

Within the meaning of the present description, the expression "Polymer" refers to any macrocellular compound comprising a chain of a plurality of monomeric units or patterns and generally containing at least 50 monomeric units, even at least 100 monomeric units. Furthermore, the term "polymer", as it is used here, includes any type of polymer, that is to say homopolymers as well as random or block copolymers, especially diblock or multiblock polymers. In addition, a polymer within the meaning of the description may have any type of structure, for example linear, branched, combed, hyperbranched or starred structure.

The Polymer (PZ)

The first polymer (PZ) used in the combination of polymers which may be used according to the invention is, characteristically, a polymer carrying zwitterionic units. Within the meaning in which it is used in the present description, the term "zwitterionic unit" denotes a monomeric unit simultaneously comprising
(i) at least one group ($G^-$) having a negative charge, at least under surface treatment conditions (and, especially, at the pH of use); and
(ii) at least one group ($G^+$) having a positive charge, at least under surface treatment conditions (and, especially, at the pH of use),
with a number of positive charges preferably equal to the number of negative charges in said zwitterionic unit.

In the zwitterionic units of the polymers (PZ), the groups having negative charges ($G^-$) typically comprise carboxylate, sulphate, sulphonate, phosphate, phosphonate, phosphinate or ethenolate anions, these groups advantageously being carboxylate, sulphonate or phosphate groups. It is generally advantageous for these groups to have a negative charge over a wide range of pH levels which, especially, enables use of the polymer (PZ) irrespective of the pH. Consequently, it is preferable to use polymers (PZ) in which the zwitterionic units contain sulphate, sulphonate or phosphate groups.

The groups ($G^+$) having positive charges of the zwitterionic units of the polymers (PZ) more often comprise -onium or -inium cations from the nitrogen, phosphorus or sulphur family, such as ammonium, pyrididium, imidazolinium, phosphonium or sulphonium cations. Advantageously, these groups are ammonium or amine groups in protonated form. Again, it is preferable to use polymers (PZ) in which the zwitterionic units have a positive charge over a wide range of pH levels, said charge preferably being permanent. As a result, it is beneficial to use polymers (PZ) in which the zwitterionic units contain quaternary ammonium groups.

Whatever their exact nature, the groups ($G^+$) and ($G^-$) of zwitterionic units are advantageously carried by a pendant chain in the zwitterionic unit, that is to say they are preferably not included in the structure of the polymer chain. In this respect, it is generally advantageous for one of the groups ($G^+$) or ($G^-$) to be a terminal group of the pendant chain which, especially, makes this group especially available for interaction with the polymer (P) and/or with the surface of the solid material to be treated.

The polymers (PZ) also advantageously comprise zwitterionic units where the groups ($G^+$) and ($G^-$) are linked together by an optionally substituted polyvalent hydrocarbon group, especially an alkylene group, optionally substituted with one or more hydroxy groups.

According to a particular embodiment, the polymers (PZ) may advantageously comprise zwitterionic units containing, as a pendant chain, at least one monovalent group, preferably selected from the following groups:

monovalent nitrogenous zwitterionic groups corresponding to the following general formulae $(GZ_N^1)$ to $(GZ_N^6)$:

$$—N^{(+)}(R^1)(R^2)—R-A-O^{(-)} \quad (GZ_N^1)$$

$$—(R^3)C=N^{(+)}(R^4)—R-A-O^{(-)} \quad (GZ_N^2)$$

$$—(R^3)(R)C—N^{(+)}(R^4)(R^5)—R-A-O^{(-)} \quad (GZ_N^3)$$

$$—N^{(+)}(=R^6)—R-A-O^{(-)} \quad (GZ_N^4)$$

$$—N^{(+)}(R^1)(R^2)—R—W^{(-)} \quad (GZ_N^5)$$

$$—R-A'(—O^{(-)})—R—N^{(+)}(R^1)(R^2)(R^7) \quad (GZ_N^6)$$

monovalent phosphoriferous zwitterionic groups corresponding to the following general formulae $(GZ_P^1)$ and $(GZ_P^2)$:

$$—P^{(+)}(R^1)(R^2)—R-A-O^{(-)} \quad (GZ_P^1)$$

$$—R-A'(—O^{(-)})—R—P^{(+)}(R^1)(R^2)(R^7) \quad (GZ_P^2)$$

monovalent sulphurous zwitterionic groups corresponding to the following general formulae $(GZ_S^1)$ and $(GZ_S^2)$:

$$—S^{(+)}(R^1)—R-A-O^{(-)} \quad (GZ_S^1)$$

$$—R-A'(—O^{(-)})—R—S^{(+)}(R^1)(R^2) \quad (GZ_S^2)$$

in which the different groups have the following meanings in the formulae $(GZ_N^1)$ to $(GZ_N^6)$, $(GZ_P^1)$, $(GZ_P^2)$, $(GZ_S^1)$ and $(GZ_S^2)$:

R denotes a linear or branched alkylene radical comprising from 1 to 15 carbon atoms, preferably from 2 to 4 carbon atoms, optionally substituted by one or more hydroxy groups or a benzylene radical $R^1, R^2, R^5$ and $R^7$, which may be the same or different, each denote, independently, an alkyl radical containing from 1 to 7 carbon atoms, preferably from 1 to 2 carbon atoms $R^3$ and $R^4$ denote hydrocarbon radicals forming, with the nitrogen atom, a nitrogenous heterocycle optionally comprising one or more other heteroatoms, for example one or more other nitrogen heteroatoms $R^6$ denotes a hydrocarbon radical forming, with the nitrogen atom, a saturated or unsaturated nitrogenous heterocycle optionally comprising one or more other heteroatoms, especially nitrogen heteroatoms A represents an $S(=O)(=O)$, $OP(=O)(O)$, $OP(=O)(OR')$, $P(=O)(OR')$ or $P(=O)(R')$ divalent radical, in which R' represents an alkyl radical containing from 1 to 7 carbon atoms or a phenyl radical A' represents the divalent radical —O—P(=O)—O—

$W^{(-)}$ represents an ethenolate functional group corresponding to one of the following formulae:

$$—O—C(O^{(-)})=C(C≡N)_2$$

$$—O—C(O)—C^{(-)}(C≡N)_2$$

$$—O—C(O)—C(—C≡N)(=C=N^{(-)})$$

Especially, examples of polymers (PZ) which are especially suitable according to the invention are zwitterionic polymers containing monovalent zwitterionic pendant groups, preferably corresponding to the foregoing formulae, bonded to carbon atoms of a hydrocarbon polymer chain forming the structure of the polymer (PZ), optionally by means of a divalent or polyvalent hydrocarbon radical (for example an alkylene or arylene) optionally interrupted by one or more heteroatoms, for example one or more oxygen atoms, or even by an ester function, an amide function, or even by a valence bond. Especially, in this respect, the hydrocarbon polymer chain (structure) of the polymer (PZ) is advantageously a linear or branched polyalkylene chain, optionally interrupted by one or more heteroatoms, such as nitrogen, sulphur or oxygen. The polymers (PZ) comprising pendant zwitterionic groups of $(GZ_N^1)$ formulae, in which A denotes an $S(=O)(=O)$ group appear to be especially beneficial according to the invention.

According to a first variant of the invention, the polymers (PZ) used for surface treatment may solely be based on a repetition of zwitterionic units, with the exclusion of other types of unit. Thus, homopolymers or copolymers of a strictly polyzwitterionic nature are concerned. According to this embodiment, the polymers (PZ) are polyzwitterions preferably having a total electrical charge of zero.

According to a second possible variant, the polymers (PZ) may be random or block copolymers further comprising, in addition to the above-mentioned zwitterionic units, other units selected from:

neutral units, which are:
units which are inherently neutral (NE), or else
units which are non-ionogenic (NI) under conditions in which the polymer (PZ) is used for surface treatment, and, especially, are non-ionogenic at the pH of use. These non-ionogenic units are, for example, weak acid groups (carboxylated for example) used below their pKa, or even weak base groups (especially amines) used above their pKa;

and/or ionic units, preferably at a concentration sufficiently low to avoid occurrences of self-combination of the polymers (PZ), where necessary.

Preferably, in accordance with this second variant, the polymers (PZ) only comprise zwitterionic units and neutral units (NE or NI). More generally, it is preferable for the polymers (PZ) to not contain ionic units other than those present in the zwitterionic units. In this respect, it is preferable for the polymer (PZ) to have a total electric charge of zero.

According to another beneficial embodiment, the polymers (PZ) are block polymers comprising a block formed exclusively of zwitterionic units and at least another block of differing nature.

Examples of neutral units potentially present in the polymers (PZ) are, especially as inherently neutral (NE) units: units obtained from ethylenically unsaturated non-ionic monomers, such as acrylamide and derivatives thereof (for example N,N-dimethylacrylamide and N-isopropylacrylamide), methacrylamide and derivatives thereof, vinyl acetate (able to form vinyl alcohol units by means of hydrolysis), $C_1$-$C_4$ alkyl esters of acrylic acid and methacrylic acid, $C_1$-$C_4$ hydroxyalkyl esters of acrylic acid and methacrylic acid, especially ethylene glycol acrylate and methacrylate and propylene glycol acrylate and methacrylate, acrylic acid and methacrylic acid polyalkoxylated esters, especially polyethylene glycol esters and polypropylene glycol esters, N-vinylpyrrolidone, N-vinylcaprolactam or even N-vinlyformamide;

as inherently non-ionogenic (NI) units in specific pH conditions: units obtained from the following ethylenically unsaturated monomers monomers having at least one carboxylic function, such as ethylenically unsaturated α-β carboxylic acids or corresponding anhydrides, such as acrylic, methacrylic and maleic acids or anhydrides, fumaric acid, itaconic acid, N-methacroyl alanine, N-acryloylglycine and water-soluble salts thereof. The corresponding units on the polymer are non-ionogenic when the pH of use is lower than the pKa of the carboxylic acid.

precursor monomers of carboxylate functions, such as tertiobutyl acrylate, which create, after polymerisation, carboxylic functions by hydrolysis. The corresponding units on the polymer are non-ionogenic when the pH of use is lower than the pKa of the carboxylic acids formed.

monoethylenically unsaturated carboxylic acid N,N(dialkylaminocoalkyl)amides, such as N,N-dimethylaminomethyl acrylamide or methacrylamide, N,N-dimethylaminoethyl acrylamide or methacrylamide, N,N-dimethylamino-3-propyl acrylamide or methacrylamide, N,N-dimethylaminobutyl acrylamide or methacrylamide. The corresponding units on the polymer are non-ionogenic when the pH of use is greater than the pKa of the amine formed by hydrolysis.

monoethylenically unsaturated α-β amino esters, such as dimethyl aminoethyl, methacrylate (DMAM), dimethyl aminopropyl methacrylate, ditertiobutylaminoethylmethacrylate, dipentylaminoethylmethacrylate. The corresponding units on the polymer are non-ionogenic when the pH of use is greater than the pKa of the amines formed.

vinyl monomers, such as N-vinyl imidazole, N-vinyl carbazole, 2-vinyl pyridine, 4-vinyl pyridine, vinyl benzylamine, vinyl benzyl dimethylamine and precursor monomers of amine functions, such as N-vinyl formamide or N-vinyl acetamide, which create primary amine functions by simple acid or basic hydrolysis. The corresponding units on the polymer are non-ionogenic when the pH of use is greater than the pKa of the amines.

Mixtures of homopolymers and/or copolymers each comprising zwitterionic units may also be used as polymers (PZ).

Generally, whatever their exact structure, the polymers (PZ) preferably comprise zwitterionic units as majority units, that is to say with a molar ratio (zwitterionic units/total polymer units) advantageously at least equal to 50%, more preferably at least equal to 70%, and even more advantageously at least equal to 80%, even at least equal to 90%.

However, according to a particular embodiment, it is conceivable to use polymers (PZ) with a majority of non-zwitterionic units, for example polymers (PZ) comprising up to 70 mol %, even up to 90 mol % non-zwitterionic units. In this case, especially with regard to random polymers, it is generally preferable for the majority of non-zwitterionic units present to be neutral units (of the type (NE) or (NI) mentioned above).

In the case of block polymer type polymers (PZ), it is desirable for at least one of the blocks present to comprise at least 40 mol % zwitterionic units, preferably at least 50 mol %, more preferably at least 70 mol %, even more advantageously at least 80 mol %, for example at least 90 mol %.

More generally, a polymer (PZ) which can be used according to the invention advantageously displays behaviour typical of that of zwitterionic-type polymers. Especially, it is generally desirable to use polymers (PZ) having a critical temperature, that is to say a temperature $T_c$ below which the polymer (PZ) is insoluble in water and above which the polymer (PZ) becomes water-soluble. Preferably, the polymers (PZ) used in the combinations of the invention have a critical temperature $T_c$ of from 0 to 100° C., for example from 10 to 90° C.

At the same time, the polymers (PZ) used preferably have an average molar mass by weight (Mw) of from 3,000 to 5,000,000 g/mol, preferably from 5,000 to 3,000,000 g/mol, and more preferably from 50,000 to 1,000,000 g/mol.

Generally, the polymers (PZ) used according to the invention may be prepared by any known method, especially by polymerisation of monomers with a zwitterionic character, or even by chemical modification (functionalisation) of a precursor polymer.

Thus, according to a first embodiment, the polymers (PZ) may be prepared by homopolymerisation or copolymerisation of monomers containing, in addition to other possible monomers, monomers carrying both zwitterionic groups of the aforementioned type and groups capable of leading to polymerisation, for example by radical polymerisation or co-polymerisation, such as:

one or more mono or polyethylenically unsaturated hydrocarbon radicals (for example vinyl, allyl, styrenyl);

one or more mono or polyethylenically unsaturated ester radicals (especially of the acrylate, methacrylate or even maleate type); or one or more mono or polyethylenically unsaturated amide radicals (especially of the acrylamido or methacrylamido type).

In this respect, one or more of the following zwitterionic monomers may, especially, be used either alone or in combination with other non-zwitterionic monomers:

acrylamido or methacrylamido dialkyl ammonium alkyl acrylate or methacrylate alkyl or hydroxyalkyl sulphonates or phosphonates, such as:

→sulphopropyl dimethyl ammonium ethyl methacrylate, sold by RASCHIG under the name SPE:

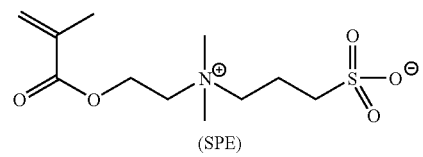 [SMILES: C=C(C)C(=O)OCC[N+](C)(C)CCCS(=O)(=O)[O-]]

(SPE)

→sulphopropyl dimethylammonium propyl methacrylamide, sold by RASCHIG under the name SPP:

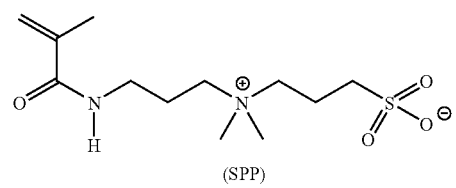

(SPP)

→sulphoethyl dimethyl ammonium ethyl methacrylate:

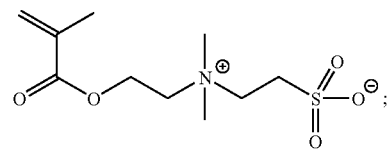 [SMILES: C=C(C)C(=O)OCC[N+](C)(C)CCS(=O)(=O)[O-]]

or else sulphobutyl dimethyl ammonium ethyl methacrylate:

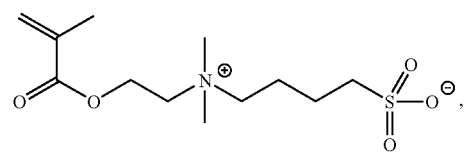 [SMILES: C=C(C)C(=O)OCC[N+](C)(C)CCCCS(=O)(=O)[O-]]

of which the syntheses are described, for example, in *Journal of Polymer Science* 40, 511-523 (2002).

→sulphohydroxypropyl dimethyl ammonium ethyl methacrylate

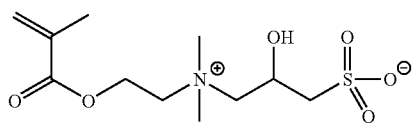 [SMILES: C=C(C)C(=O)OCC[N+](C)(C)CC(O)CS(=O)(=O)[O-]]

→sulphopropyl dimethylammonium propyl acrylamide:

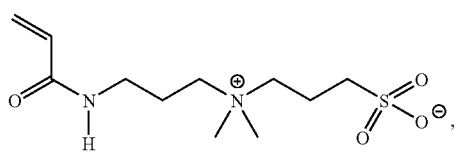 [SMILES: C=CC(=O)NCCC[N+](C)(C)CCCS(=O)(=O)[O-]]

of which the synthesis was described by Wen-Fu Lee and Chan-Chang Tsai, in *Polymer*, 35 (10), 2210-2217 (1994).

→sulphohydroxypropyl dimethylammonium propyl methacrylamide,

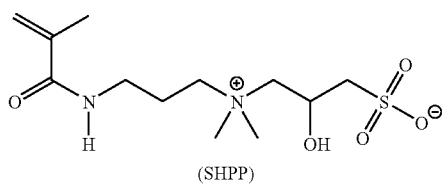 [SMILES: C=C(C)C(=O)NCCC[N+](C)(C)CC(O)CS(=O)(=O)[O-] ; "(SHPP)"]

(SHPP)

→sulphopropyl diethyl ammonium ethyl methacrylate:

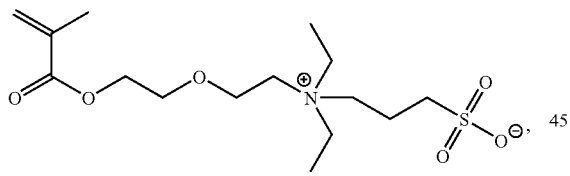

of which the synthesis was described by V. M. Monroy Soto and J. C. Galin, in *Polymer*, 1984, Vol 25, 121-128.

heterocyclic betaine monomers, such as

→sulphobetaines derived from piperazine, especially the following monomers:

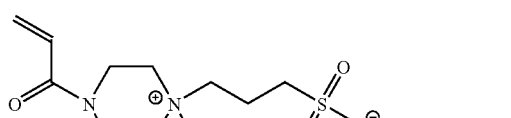

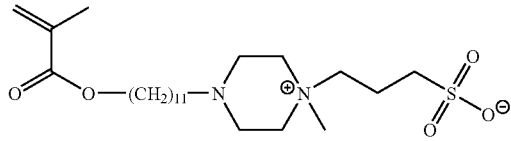

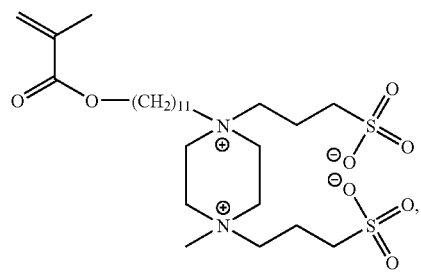

of which the synthesis was described by P. Koberle and A. Laschewsky, in *Macromolecules* 27, 2165-2173 (1994)

→sulphobetaines derived from 2-vinylpyridine at 4-vinylpyridine, such as:

2-vinyl (3-sulphopropyl)pyridinium betaine (2SPV), sold by RASCHIG under the name SPV,

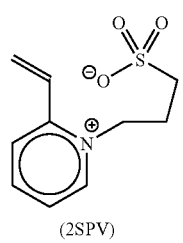

(2SPV)

or even 4-vinyl (3-suilphopropyl)pyridinium betaine (4SPV):

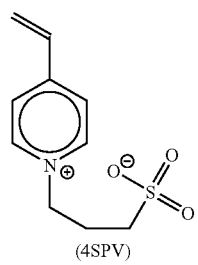

(4SPV)

of which the synthesis was described by V. M. Castaño and A. E. González, J. Cardoso, O. Manero and V. M. Monroy, in *J. Mater. Res.*, 5 (3), 654-657 (1990):

→1-vinyl-3-(3-sulphopropyl) imidazolium betaine:

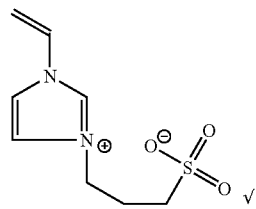

-continued

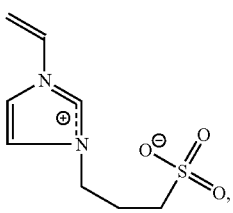

of which the synthesis was described by J. C. Salamone, W. Volkson, A. P. Oison, S. C. Israel, in *Polymer,* 19, 1157-1162 (1978)

alkyl or hydroxyalkyl sulphonates or phosphonates of alkyl allyl dialkyl ammonium, such as sulphopropyl methyl diallyl ammonium betaine:

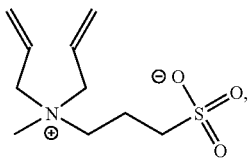

of which the synthesis was described by Philippe Favresse and Andre Laschewsky, in *Macromolecular Chemistry and Physics,* 200(4), 887-895 (1999).

alkyl or hydroxyalkyl sulphonates or phosphonates of alkyl styrene dialkyl ammonium, such as:

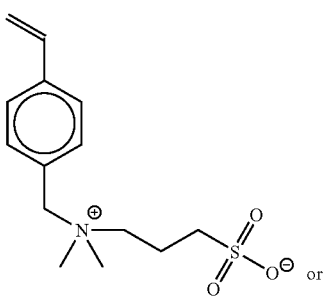

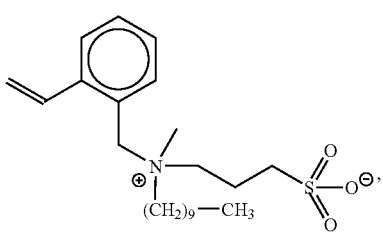

of which the synthesis was described by P. Koberle and A. Laschewsky, in *Macromolecules* 27, 2165-2173 (1994).

betaines resulting from ethylenically unsaturated dienes and anhydrides, such as:

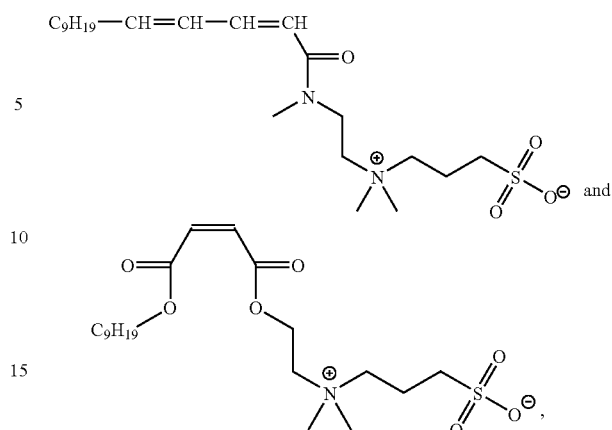

of which the syntheses were described by P. Koberle and A. Laschewsky, in Macromolecules 27, 2165-2173 (1994)

phosphobetaines, such as:

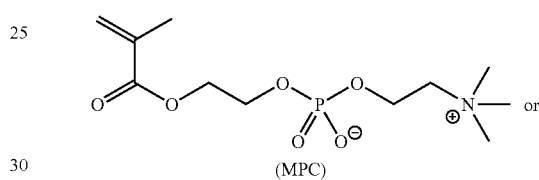
(MPC)

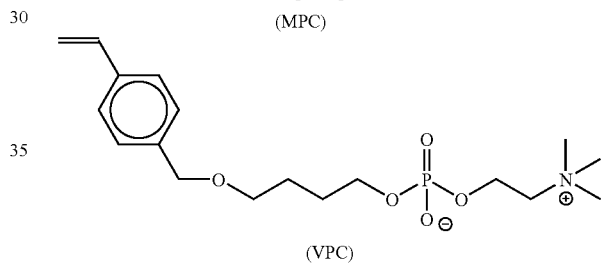
(VPC)

of which the syntheses were described in EP 810 239, betaines resulting from cyclic acetals, such as (((dicyanoethanolate)ethoxy)dimethylammoniumpropylmethacrylamide:

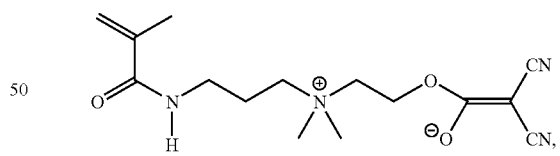

of which the synthesis was described by M-L. Pujol-Fortin et al, in *Macromolecules* 24, 4523-4530 (1991).

According to another possible preparation method, the polymers (PZ) which can be used according to the invention may be obtained by chemical modification of a precursor polymer (homopolymer or copolymer).

In this respect, a polymer (PZ) which can be used according to the invention may be prepared, for example, by chemically modifying (co)polymers with pendant amine functions (preferably a tertiary amine) especially by reaction with a sulfone (for example propanesultone, butanesultone), by a halogenoalkylsulphonate or even by any other sulphonated electrophilic compound. For more details regarding methods for obtaining polysulphobetaines by chemically modifying a precursor polymer by sultones and halogenoalkylsulphonates, reference should be made, especially, to the articles Polymer 41, 831-837 (2000); Polymer 38 (4), 971-979 (1997); *Journal of Applied Polymer Science* 80, 1619-1626 (2001), *Chem. Commun.*, 1555-1556 (1996), *Macromolecules* 32, 2141-2146 (1999), or even to the Japanese patent application published on 21 Dec. 1999 under number 11-349826. Preparation of polyphosphonato betaines and phosphinato betaines by chemical modification is also reported in *Macromolecular Chemistry* 187, 1097-1107 (1986).

Examples of polymers (PZ) which are especially beneficial within the scope of the invention are, especially, methacrylate or methacrylamide alkyl dialkyl ammonium alkylsulphonates or hydroxyalkylsulphonates and sulphobetaines derived from a vinylpyridine. According to a especially beneficial embodiment, the polymers (PZ) are methacrylate and methacrylamide dialkyl ammonium alkylsulphonate or hydroxyalkylsulphonate-type polymers.

According to a especially beneficial embodiment, the polymer (PZ) is a polyzwitterionic polymer selected from the following polymers or mixtures thereof:
homopolymers (optionally partially hydrolysed) or copolymers formed by a chain of betaine units comprising pendant groups based on the above-mentioned formula ($GZ_N^1$), in which A denotes an $S(=O)(=O)$ group, said betaine units preferably being based on the following formulae (-SPE-) and/or (-SPP-):

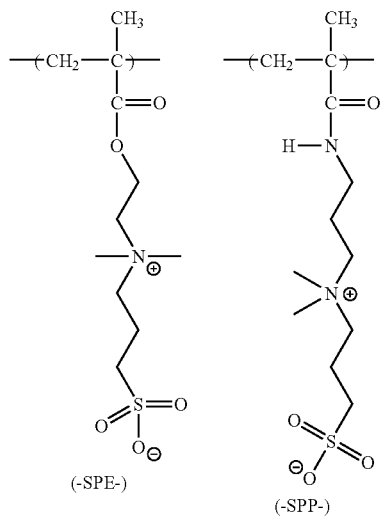

homopolymers of sulphobetaine derived from 2-vinylpyridine, of the following formula

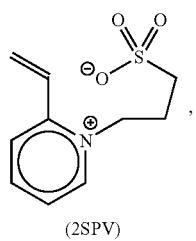

(2SPV)

More generally, the polymers comprising units selected from those having the formulae (-SPE-), (-SPP-), (-SHPE-) and (-SHPP-) above appear, most often, to be well suited as polymers (PZ) according to the invention. Homopolymers and copolymers of this type having an average molar mass by weight ($M_w$) of from 5,000 to 3,000,000 g/mol, for example from 50,000 to 1,000,000 g/mol are especially advantageous.

The following have proven to be especially advantageous according to the invention:
poly(sulphopropyl dimethyl ammonium methacrylate) homopolymers, known as poly(SPE), formed by a chain of (-SPE-) units mentioned above, as well as copolymers based on chains of (-SPE-) units and —[$CH_2C(—CH_3$)(—COOH)]-(AMA-) methacrylic acid units. These copolymers, known as poly(SPE)(AMA), are typically random polymers and preferably contain less than 20 mol %, advantageously less than 10 mol % (-AMA-) units. These copolymers may be obtained by direct copolymerisation of SPE and AMA monomers or by partial hydrolysis of SPE units of a poly(SPE) homopolymer, the hydrolysis preferably involving less than 20 mol %, advantageously less than 10 mol % SPE units;

and
poly(sulphopropyl dimethyl ammonium propyl methacrylamide) homopolymers, known as poly (SPP), formed by a chain of (-SPP-) units mentioned above, as well as copolymers based on chains of (-SPP-) units and (-AMA-) methacrylic acid units. These copolymers, known as poly(SPP)(AMA), are generally random and preferably contain less than 20 mol %, advantageously less than 10 mol % (-AMA-) units. These copolymers may be obtained by direct copolymerisation of SPP and AMA monomers or by partial hydrolysis of the (-SPP-) units of a poly(SPP) homopolymer, the hydrolysis preferably involving less than 20 mol %, advantageously less than 10 mol % (-SPP-) units.

The Polymer (P)

The second component of the polymer combination which can be used according to the invention is a polymer (P) carrying charged groups and able to bond with the polymer (PZ).

This second polymer (P), which is different from the polymer (PZ), is typically a polymer with an ionic character, that is to say, most often:
a cationic polymer known as (P$^+$) which is preferably a polycation carrying a plurality of cationic charges and generally having a positive total electric charge; or
an anionic polymer known as (P$^-$) which is advantageously a polyanion carrying a plurality of anionic groups and generally having a negative total electric charge.

The combination may contain a cationic polymer (P$^+$) and an anionic polymer (P$^-$). Using a polymer (P$^+$) and a polymer (P$^-$) simultaneously may, especially, improve the effect of hydrophilisation and/or may improve the homogeneity of the surface treatment.

The polymer (P) is specifically a polymer able to bond with the polymer (PZ). Consequently, it is generally advantageous to use, as the polymer (P) a polymer carrying charges which are opposite to those of the most accessible charged groups present on the zwitterionic units of the polymer (Z).

Thus, according to a first beneficial embodiment, the following polymers are used in the polymer combination of the invention:
as the polymer (PZ): a polymer known as (PZ$^{(+)-}$) in which the zwitterionic units carry anionic groups which are more accessible than the cationic groups; and as the polymer (P): a cationic polymer (P⁺) carrying cationic groups and generally having a positive total electric charge.

According to this first embodiment of the invention, the zwitterionic units of the polymer (PZ$^{(+)-}$) are advantageously pendant groups carrying terminal anionic groups (accessible "at the periphery" of the polymer) and non-terminal cationic groups (therefore closer to the structure of the polymer and consequently less accessible). In this respect, the polymer (PZ$^{(+)-}$) advantageously comprises, at its zwitterionic units, zwitterionic groups corresponding to the aforementioned formulae (GZ$_N^1$), (GZ$_N^2$), (GZ$_N^3$), (GZ$_N^4$), (GZ$_N^5$), (GZ$_P^1$) and/or (GZ$_S^1$). Especially advantageously, the polymer (PZ) is, in this case, a polycarboxybetaine or, more preferably, a polysulphobetaine, advantageously carrying zwitterionic groups of the formula (GZ$_N^1$), in which A is an —S(=O)(=O) group.

According to this first embodiment, the polymer (PZ$^{(+)-}$) may optionally comprise, in addition to zwitterionic units, groups carrying anionic groups which may interact with the cationic groups of the polymer (P⁺) so as to strengthen the combination sought between the polymers (P⁺) and (PZ$^{(+)-}$).

The cationic polymer (P⁺) used in the combinations of (PZ$^{(+)-}$)+(P⁺)-type polymers may be selected from any cationic polymers. Polymers of this type are known to the person skilled in the art. They may be, for example, cationic polymers of natural origin or modified (quaternisation) cationic polymers, such as cationic polysaccharides. Examples are cationic guars, cationic celluloses and cationic starches. They may also be synthetic cationic polymers, such as homopolymers or copolymers comprising units carrying groups which are cationic in usage conditions, these groups preferably being permanent cationic groups. The aforementioned cationic polymers may be used in the aforementioned combinations of (PZ$^{(+)-}$)+(P⁺)-type polymers but also in other polymer combinations according to the invention.

Examples of cationic units (or potentially cationic units developing a positive charge in usage conditions) which may be present on the polymer (P⁺) are:

permanent cationic units of the type which are derived from other ethylenically unsaturated monomers, such as:

aminoacryloyl or acryloyloxy monomers, such as trimethylaminopropylmethacrylate chloride, trimethylaminoethylacrylamide chloride or bromide or trimethylaminoethylmethacrylamide chloride or bromide, trimethylaminobutylacrylamide methylsulphate or trimethylaminobutylmethacrylamide methylsulphate, trimethylaminopropyl-methacrylamide methyl sulphate (MES), (3-methacrylamidopropyl)trimethylammonium chloride (MAPTAC), (3-acrylamidopropyl)trimethylammonium chloride (APTAC), methacryloyloxyethyl trimethylammonium chloride or methylsulphate, acryloyloxyethyl trimethylammonium chloride;

1-Ethyl 2-vinylpyridinium bromide, chloride or methylsulphate;

N,N-dialkyldiallylamine allyl monomers, such as N,N-dimethyldiallylammonium chloride (DADMAC);

vinyl monomers, such as vinyl benzyl dimethylammonium chloride or bromide (VBTMAC);

polyquaternary monomers, such as dimethylaminopropylmethacrylamide,N-(3-chloro-2-hydroxypropyl)trimethylammonium chloride (DIQIJAT) or its higher homologue, TRIQIJAT:

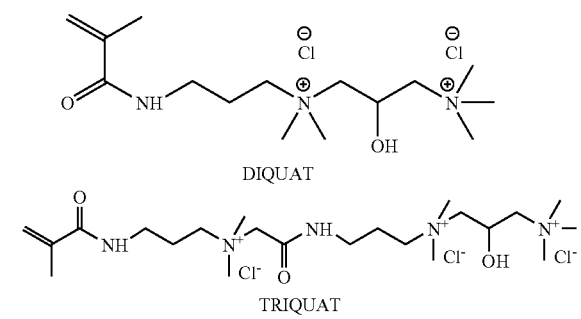

non-permanent cationic units derived from ethylenically unsaturated monomers, such as:

N,N(dialkylaminocoalkyl) amides of monoethylenically unsaturated α-β carboxylic acids, such as N,N-dimethylaminomethyl acrylamide or methacrylamide, N,N-dimethylaminoethyl acrylamide or methacrylamide, N,N-dimethylamino-3-propyl acrylamide or methacrylamide, N,N-dimethylaminobutyl acrylamide or methacrylamide monoethylenically unsaturated α-β aminoesters, such as dimethyl aminoethyl methacrylate (DMAM), dimethyl aminopropyl methacrylate, ditertiobutylaminoethylmethacrylate, dipentylaminoethylmethacrylate vinyl monomers, such as N-vinyl imidazole, N-vinyl carbazole, 2-vinyl pyridine, 4-vinyl pyridine, vinyl benzylamine, vinyl benzyl dimethylamine precursor monomers of amine functions, such as N-vinyl formamide or N-vinyl acetamide, which create primary amine functions by mere acid or basic hydrolysis.

As well as these cationic units, the polymer (P⁺) may optionally comprise other units, such as:

neutral units (that is to say units which are inherently neutral (NE) or even non-ionogenic (NI) in usage conditions);

optionally anionic units, preferably, where necessary, due to a molar ratio (anionic units/cationic units) of less than 50%, and preferably less than 40%, for example less than 30%, the polymer (P⁺) advantageously having a positive total electric charge.

Furthermore, it should be noted that anionic species (especially anionic polymers or other anionic compounds) may generally be introduced into (PZ$^{(+)-}$)+(P⁺)-type polymer-based combinations. If necessary, it is, however, preferable in this respect to first of all mix the polymers (PZ$^{(+)-}$) and (P⁺), and to only introduce the anionic species into the mixture in a second stage which allows the three compounds to bond. On the other hand, introducing the anionic species at the start generally impedes formation of a bond between the polymers (PZ$^{(+)-}$) and (P⁺).

Particular (PZ$^{(+)-}$)+(P⁺) combinations which can be used within the scope of this variant of the invention are combinations of original polymers which, to the knowledge of the inventors, have never been described. They are combinations comprising at least one sulphobetaine or carboxybetaine zwitterionic unit-based zwitterionic polymer (PZ), the total charge of this polymer (PZ) being zero or not zero; and at least one cationic polymer.

According to another feature, the invention also relates to these combinations of specific polymers.

According to another embodiment, the polymer combination of the invention uses the following polymers:
as the polymer (PZ): a polymer known as (PZ$^{(-)+}$), in which the zwitterionic units carry cationic groups which are more accessible than the anionic groups; and
as the polymer (P): an anionic polymer (P$^-$) carrying anionic groups and generally having a negative total electric charge.

According to the second embodiment of the invention, the zwitterionic units of the polymer (PZ$^{(-)+}$) are advantageously pendant groups carrying terminal (accessible) cationic groups and non-terminal (less accessible) anionic groups. Consequently, the polymers (PZ$^{(-)+}$) advantageously comprise, at their zwitterionic units, zwitterionic groups corresponding to the aforementioned formulae (GZ$_N^6$), (GZ$_P^2$), and/or (GZ$_S^2$). The polymer (PZ) is, in this case, especially advantageously a polyphosphobetaine.

In this embodiment, the polymer (PZ$^{(-)+}$) may optionally comprise, in addition to zwitterionic units, groups carrying cationic groups which may interact with the anionic groups of the polymer (P$^-$) in order to strengthen the desired bond between the polymers (P$^-$) and (PZ$^{(-)+}$).

The anionic polymer (P$^-$) used in the combinations of (PZ$^{(-)+}$)+(P$^-$)-type polymers is a homopolymer or a copolymer comprising units carrying groups which are anionic in usage conditions, said groups preferably being permanent anionic groups. An anionic polymer of this type may be used in the combinations of the above-mentioned (PZ$^{(-)+}$)+(P$^-$)-type polymers and also in other polymer combinations according to the invention.

Examples of anionic units which may be present on the polymer (P$^-$) are units of the type derived from ethylenically unsaturated monomers, such as
monomers having at least one carboxylic function, mentioned above, when the pH of use is greater than the pKa of the carboxylic acid
precursor monomers of carboxylate functions, mentioned above, when the pH of use is greater than the pKa of the carboxylic acid
monomers having at least one sulphonate or sulphate function, styrene sulphonic acid (Spinomar NaSS, sold by Tosoh), (meth)allyl sulphonic acid (Geropon MLS/A, sold by Rhodia), sulphonic 2-acrylamido-2-methylpropane (AMPS, sold by Lubrizol), sulphopropyl(meth) acrylate (SPA and SPM, sold by Raschig) or sulphoethyl (meth)acrylate (SEM, sold by Laporte) and water-soluble salts thereof
monomers having at least one phosphonate or phosphate function, such as vinylphosphonic acid (sold by Rhodia), esters of ethylenically unsaturated phosphates, such as phosphates derived from hydroxyethyl methacrylate and those derived from polyoxyalkylene methacrylates and water-soluble salts thereof, when the pH of use is greater than the pKa of the phosphonate and phosphate functions.

In addition to these anionic units, the polymer (P$^-$) may optionally comprise other units, such as:
neutral units (that is to say units which are inherently neutral (NE) or else non-ionogenic (NI) in usage conditions);
optionally cationic units, preferably, where necessary, due to a molar ratio (anionic units/cationic units) of less than 50%, preferably less than 40%, for example less than 30%, the polymer (P$^-$) advantageously having a negative total electric charge.

Cationic species (especially cationic polymers or other cationic compounds) may be introduced into combinations based on (PZ$^{(-)+}$)+(P$^-$)-type polymers. In order to do this it is, however, preferable to first of all mix the polymers (PZ$^{(-)+}$) and (P$^-$) and to only introduce the cationic species into the mixture in a second stage which allows the three compounds to bond. On the other hand, introducing the anionic species at the start generally impedes formation of a bond between the polymers (PZ$^{(-)+}$) and (P$^-$).

Particular (PZ$^{(-)+}$)+(P$^-$) combinations which can be used within the scope of the second variant of the invention are combinations of original polymers which, to the knowledge of the inventors, have never been described. They are combinations comprising:
at least one zwitterionic polymer (PZ) based on phosphobetaine zwitterionic units, this polymer having a total charge of zero; and
at least one anionic polymer (P$^-$).

These combinations of specific polymers also constitute, according to another feature, a particular object of the invention.

Whatever its exact nature, the polymer (P) used typically has an average molar mass by weight (Mw) of from 3,000 to 5,000,000 g/mol, preferably from 5,000 to 3,000,000 g/mol, and more preferably from 40,000 to 1,000,000 g/mol.

Furthermore, generally, whatever the polymers (PZ) and (P) used, it is preferable to use these polymers in quantities so the ratio of the quantity of charged units carried by the polymer (P) in relation to the quantity of zwitterionic units carried by the polymer (PZ), is from 0.1 to 10, this ratio preferably being at least 0.5 and generally remaining lower than 8, for example from 1 to 5. This range generally makes it possible to obtain optimum combinations leading to a especially effective surface treatment.

According to a third particular embodiment, the polymer combination of the invention uses a combination containing at least the following polymers:
the polymer (PZ),
a cationic polymer (P$^+$) carrying advantageously-terminal cationic groups, and
an anionic polymer (P–) carrying advantageously-terminal anionic groups.

In this particular embodiment, the polymer (PZ) may, especially, be of the aforementioned (PZ$^{(+)-}$) or (PZ$^{(-)+}$) type.

Everything that has been indicated above with regard to the polymers (PZ), (PZ$^{(+)-}$), (PZ$^{(-)+}$), (P$^+$) and/or (P–) may be applied to this third particular embodiment. It should be noted, especially, that the polymer (P–) may originate from an ingredient of a formulation with which the (PZ$^{(-)+}$) and optionally (P+) polymers are placed in the presence of, for example, a polymer comprising (meth)acrylic acid units or a salt of this acid, and may be present in a dishwasher formulation.

Some combinations which can be used within the scope of the third particular embodiment of the invention as defined above are combinations of original polymers which, to the knowledge of the inventors, have never been described. They are combinations comprising:
at least one phosphobetaine zwitterionic unit-based zwitterionic polymer (PZ), this polymer having a total charge of zero;
at least one anionic polymer (P$^+$), and
at least one anionic polymer (P$^-$).

As was mentioned above in the present description, the combination of polymers of the invention may be used in order to carry out different surface-modification treatments in order to obtain surface treatments which are durable and resistant, especially to washes with water and saline solutions. Consequently, a composition containing a combination of polymers (PZ) and (P) are generally deposited on the surface to be treated, generally within a solvent medium (typically water or an aqueous solution optionally containing salts or else, alternatively, an organic solvent) with a content by weight in said combination of polymers typically from 1 to 1,000,000 ppm (10%), said content generally being less than 10,000 ppm (1%), especially less than 1,000 ppm (0.1%), for example from 10 to 100 ppm. This surface treatment generally leads to a especially effective surface treatment significantly modifying the surface properties of the treated solid.

Especially, the polymer combinations of the invention have proven to be especially suitable for modifying the hydrophilic surface properties of a solid material. Use of the polymer combinations of the invention within this scope for controlling the hydrophilic properties of the surface of a solid material constitutes a specific object of the present invention.

The hydrophilic properties of the surface of a solid material, which translate into terms of wettability of said surface by water, may be quantified by measuring the contact angle between a drop of distilled water and said surface. This contact angle, generally known as angle alpha, corresponds to the angle existing between the surface and the tangent to the drop of water at the surface/water/air interface and may be measured, especially, using a conventional device for measuring the contact angle, such as the SDT-200 sold by IT Concept, used in static mode or even using goniometers for measuring the wetting angle, for example the devices sold under the trade name Tantec. The contact angle measured within this scope is from 0 to 1800:

If the angle is zero, wetting is total. The liquid spreads completely over the surface and there are therefore strong interactions between the support and the liquid.

If the angle is 180°, the wetting is 0. The liquid forms a ball. There is only one point of contact between the liquid and the support and, above all, no affinity.

According to a particular embodiment, the polymer combinations of the invention may be used to render an initially hydrophobic surface more hydrophilic, that is to say to increase the wettability with water of an initially hydrophobic surface. In this respect, the polymer combinations of the invention increase, especially, the wettability of surfaces having contact angles greater than 50°, the hydrophilic increase obtained being especially effective when surfaces are treated which initially have a contact angle greater than 70°, and even more so when this angle is greater than 90°. Within this scope, the treatment of the invention makes it possible to reduce the contact angle, that is to say to increase wetting.

This surface hydrophilisation by polymer combinations of the invention may be used in various ways.

Especially, the hydrophilisation method of the invention may be used to confer an affinity for water to initially largely hydrophobic plastics material surfaces, such as a surface based on a polymer selected from plastic or thermoplastic polymers, such as polyamides, polycarbonates, polyethylene-terephthalate, methyl polymethacrylate, polypropylenes, polyethylenes, polystyrenes, polyesters, acrylonitrile butadiene styrene (ABS) or poly(vinyl)chlorides. This improvement in affinity for water following the deposit of the polymer combination of the invention can be revealed by measuring, under the same condition of temperature and relative humidity, the contact angle presented by a droplet of water deposited on the surface before and after deposit of said combination of polymers.

Polymer-based surfaces of the aforementioned type, especially polyethylene or polypropylene-based surfaces, initially display hydrophobic behaviour and are hardly wetted or are not wetted at all with water, that is to say they have contact angles with water generally greater than 70°, more often greater than 90° (approximately 105° for a pure polypropylene surface). Treating surfaces of this type with polymer combinations according to the invention makes it possible to significantly reduce these contact angles and this enables wetting of the surface with water.

In this respect, the treatment of the invention may, for example, be used to improve the affinity for water of hydrophobic plastics material fibre-based materials, especially non-woven materials of the voile or film type, which may be porous or discontinuous, which are used, for example, as surface materials in babies' nappies or similar products, such as feminine hygiene products or incontinence products for adults.

In this respect, the combinations of polymers (PZ) and (P) have generally proven to be a lot more beneficial than the surface-active compounds usually used to increase the wettability of non-woven textile-type materials. Especially, the polymer combinations of the invention ensure a surface treatment which is a lot more stable and durable by avoiding problems at the start of treatment which are encountered when surface active agents are used. Especially, the surface treatment obtained according to the invention is resistant to washes with saline aqueous solutions.

Another use of the hydrophilisation treatment of the invention relates to improving the wettability of the surface of hydrophobic polymer-based solid objects, such as parts for the automotive industry (especially parts of the bodywork or interior decoration). In this respect, the obtained increase in wettability may, especially, be used to enable or facilitate a subsequent deposit of aqueous compositions on the treated plastics material parts which, especially, makes it possible to paint the parts thus treated, especially by coating, using non-solvent aqueous paints which are better for the environment than solvent paints which would be needed to paint untreated surfaces.

Another use of the hydrophilisation treatment of the invention relates to improving the wettability of the surface of hydrophobic polymer-based solid objects, such as parts for the automotive industry (especially parts of the bodywork or interior decoration), or furniture, especially urban furniture or garden furniture or kitchen or bathroom furniture and constructions. Polypropylene (PP)-based polymers or polyethylene (PE)-based polymers may be concerned especially. In this respect, the obtained increase in wettability may, especially, be used to limit the formation or appearance of stains which may originate from aqueous media, to facilitate cleaning, to accelerate drying and/or to spread marks in such a way as to limit the visual impact thereof.

The hydrophilisation treatment of the invention may also be used to facilitate drying of plastics material parts subjected to washes with water, for example polyolefin (PE, PP) objects or containers for food that are to be cleaned in an automatic dishwasher. In fact, contrary to glass or ceramic utensils which are dried in the dishwasher, polyolefin utensils remain wet which is explained by the fact that the water droplets do not spread over their highly hydrophobic surface. The treatment of the invention, by improving wettability, is capable of making polyolefin-type polymer-based materials behave similarly to those made of glass or ceramic insider the dishwasher, thus making it possible to obtain the dry surface after washing. The resistance of the surface treatment of the invention to washing with water and saline solutions is especially beneficial in this respect, especially in the field of washing in a dishwasher, in which the surface is subjected to this type of washing, especially with saline solutions during washing and rinsing.

The hydrophilisation method of the invention also confers a lipophobic character to the treated surfaces which may, especially, be used to avoid the deposit of fatty soilings on the surface which may, for example, be used to treat polymer-based packaging or films. In this respect, the hydrophilising treatment also leads, more often, to an improvement in the flow of charges of static electricity which makes it possible, especially, to avoid the deposit of dust and dirt on the treated films or packaging.

These different uses of combinations of polymers (PZ) and (P) to enable or improve the efficacy of deposits of aqueous compositions on initially hydrophobic surfaces in order to facilitate drying of initially hydrophobic surfaces subjected to washes with water as well as to inhibit soiling of an initially hydrophobic surface, constitute another object of the invention, just as the materials with a modified surface obtained in this respect.

According to another embodiment, the polymer combinations of the invention may, on the contrary, be used to reduce the wetting character of an initially hydrophilic surface (that is to say to decrease its initial hydrophilic properties). In this respect, the treated solid advantageously has an initial contact angle of less than 40°, preferably less than 20°, more preferably less than 10°, the hydrophobisation treatment of the invention being especially significant when surfaces which are initially highly wettable with water are used.

This surface hydrophobisation treatment may, especially, be used to hydrophobise glass surfaces or else metal surfaces, for example aluminium or steel surfaces.

According to yet another feature, the polymer combinations of the invention may be used to modify the capacity of the surface of a solid material to support and/or retain a film-forming (for example paint) or adhesive (glue) composition. This specific use of the polymer combinations of the invention constitutes yet another object of the present invention.

The hold of the deposited film may, for example, be quantified by measuring the peeling strength of the deposited film at 90°, at a given peeling speed, for example using an Adamel-Lhomagry DY-30 dynamometer, the stability of the coating deposited on the surface being greater than this peeling strength being significant In this respect, depending on the polymers (PZ) and (P) selected and their respective proportions, the polymer combinations of the invention may be used to improve application of a film-forming or adhesive composition and/or to improve the subsequent hold of the film deposited on the treated surface or else, on the contrary, to reduce the efficacy of the application of a film-forming or adhesive composition on the treated surface and/or to reduce the concentration of the deposit of the composition thus obtained on said surface.

This modulation of the efficacy of the application of the deposit and of its subsequent hold may, especially, be used to promote the deposit of aqueous compositions (for example non-solvated paints) on hydrophobic surfaces, such as polymers, especially on polypropylene or polyethylene surfaces.

Conversely, the polymer combinations of the invention may be used to inhibit the subsequent deposit of paints on treated surfaces or, at the very least, to reduce the hold of paints deposited on said surface. This treatment makes it possible, for example, to protect walls against the deposit of graffiti.

In this respect, the inventors have shown that, for a given surface, two polymers (PZ) and (P) of the aforementioned type may be used in combination to modify the efficacy of a deposit of a film-forming and/or adhesive composition and the hold of the deposit achieved, in one way or another, subject to suitably adjusting the ratio between the two polymers as well as their respective molecular weights.

More precisely, the inventors have shown that, for two given polymers (PZ) and (P) of the aforementioned type used in a given ratio, it is possible to establish a diagram of the type illustrated in appended FIG. 2, which systematically shows two regions on both sides of a separation surface, that is to say a first region where the efficacy of the deposit and the subsequent adhesion are promoted, and another region where the efficacy of the deposit and its subsequent adhesion are, on the contrary, reduced. A diagram similar to that shown in FIG. 2 is observed with all the aforementioned types of polymers (PZ) and (P). It is down to the skills of the specialist trying to modify the surface properties of a given solid material to establish a diagram of this type in order to determine the molar masses of the polymers (PZ) and (P) to be used for a given ratio, based on which he is trying to obtain an improvement or a decrease in the deposition and adhesion properties.

Moreover, the combinations of the invention may be advantageously used to fix an active ingredient on the treated surface. Consequently, the polymer combination used contains said active ingredient. This active ingredient may, for example, be one of the polymers (P) or (PZ), which comprises, if necessary, in addition to the aforementioned groups, functions which provide it with a specific activity (for example an anti-UV effect, or a colouring agent, or else a biocide activity.) Alternatively, the combination of polymers (P) or (PZ) may include an active ingredient as an additional ingredient, said additional compound thus preferably being a compound able to develop interactions with one and/or the other of the polymers (PZ) and (P). Thus, it may be, for example, an ionic compound able to complex with all or some of the ionic groups present on the polymers (PZ) and (P). In $(PZ^{(-)+})+(P^-)$-type combinations, this additional compound is advantageously a cationic compound. Conversely, in the case of $(PZ^{(+)-})+(P^+)$-type combinations, this additional compound is preferably an anionic compound.

Generally, the invention may be used on any type of surface and it is barely sensitive to different affinities of surfaces. This versatility enables many uses which represents a significant benefit (it is not necessary to envisage and provide different treatments for each surface).

Further aspects and advantages of the invention will become more clear from the illustrative examples provided below which refer to the figures.

EXAMPLES

Figure 1:
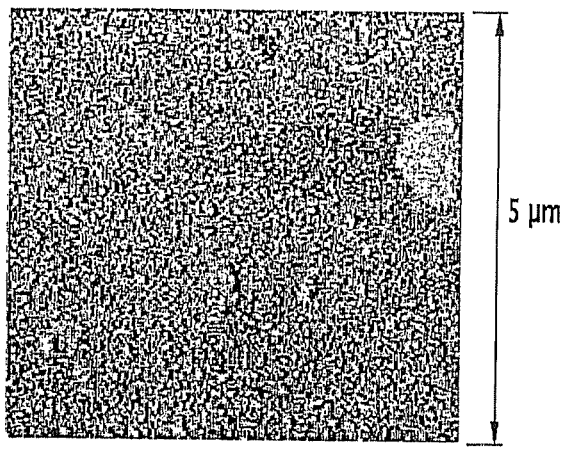
FIG. 1 shows a picture of a silica surface modified by a polymer combination of example 2, shown under an atomic force microscope. The photograph shows a square surface of the material having dimensions of 5 μm ×5 μm, in which a structured deposit based on the polymer combination can be seen in the form of discrete coacervates.

The abbreviations below will be used in the following examples:

SEP: propyl sulphonate dimethyl ammonium ethyl methacrylate

Poly(SEP): poly(propylsulphonate dimethyl ammonium ethyl methacrylate) polymer which can be prepared according to the process described in EP1594945 especially.

SPP: sulphopropyl dimethyl ammonium propyl methacrylamide

Poly(SPP): poly(sulphopropyl dimethyl ammonium propyl methacrylamide) polymer which can be prepared according to the process described in EP1594945 especially.
DADMAC: diallyldimethylammoniuin chloride (DiAllylDiMethylAmmonium Chloride)
Poly(DADMAC): poly(diallyldimethylammonium chloride) polymer
DP: average degree of polymerisation of a polymer
MW: molar mass by weight of a polymer Example 1

Promotion of Wettability of Plastics Material Surfaces with Water by a Poly(SPP)- and Poly(DADMAC)-Based Composition C1

Drying in an Automatic Dishwasher

Preparation of the Composition C1

627 g of deionised water and a magnetic stirring bar were introduced into a 1 litre plastics material container, then 1.88 g of dialysed, dry poly(SPP) with a DP of 3425 and an MW of 1000 kg/mol were added. The mixture thus produced was stirred magnetically at 300 rpm for 120 minutes.

15.6 g of an aqueous solution of poly(DADMAC) (DP=2778; MW=450 kg/mol) (commercially available solution, 20% by weight, from Aldrich) were then added, and the medium was subsequently stirred at 300 rpm for 15 minutes.

In this way, a composition comprising the combination of polymers in the form of coacervates and having a DADMAC/SPP molar ratio of 3 (ratio of the number of DADMAC monomer units added in relation to the number of SPP units added) was obtained.

Preparation of Control Compositions T1-1 and T1-2

For comparative purposes, the following controls were prepared:
Control Composition T1-1: Poly(SPP), without Poly(DADMAC)

100 g of deionised water and a magnetic stirring bar were introduced into a 1 litre plastics material container, then 5 g of dialysed, dry poly(SPP), as used in composition C1, were added. The mixture thus produced was stirred magnetically at 300 rpm for 120 minutes.

Control Composition T1-2: Poly(DADMAC), without Poly(SPP)

75 g of deionised water and a magnetic stirring bar were introduced into a 1 litre plastics material container, then 25 g of an aqueous solution of 20% poly(DADMAC), as used in the preparation of composition C1, were added, and the medium was subsequently stirred at 300 rpm for 15 minutes.

Modification of the Wettability of Plastics Material Surfaces and Drying in a Dishwasher The three following plastics material surfaces S1-1, S1-2 and S1-3 were tested (surfaces commonly found in domestic use):
S1-1: melamine plate
S1-2: styrene-acrylonitrile box
S1-3: Tupperware These surfaces were subjected to different treatments in an automatic dishwasher, the treatments comprising the following two steps (i) and (ii) in each case:
(i) the tested surface, initially non-treated, was first prewashed in the dishwasher with a washing cycle comprising:
washing at 50° C. with a washing solution with a high pH, comprising, by weight: 63.8% of sodium tripolyphosphate (STPP); 35% of Simet AG; 0.6% of antarox B79R and 0.6% of antarox B12DF; then
rinsing with citric acid and purified water; then
washing with the detergent sold under the name "Somat 3in1";
then
(ii) the surface which was prewashed in this way was subjected to a second complete washing cycle, and, at the beginning of the washing stage at 50° C., one of the compositions listed in Table 1 below was added (Somat 3in1 tablet and/or composition C1, T1-1 or T1-2).

The surfaces were examined upon completion of each treatment. Whether or not the surfaces seemed dry, and thus the way water acted on the surface obtained, was assessed in accordance with the following evaluation scale from −2 to +2:
(−2): surface is very hydrophobic, water droplets run down the surface
(−1): surface is hydrophobic, water droplets adhere to the surface
(0): surface is neutral, there are traces of water which contract rapidly
(+1): surface is hydrophilic, a film of water forms and contracts rapidly
(+2): surface is very hydrophilic, an entire film of water forms, without contraction The results observed are provided in Table 1 below.

TABLE 1

Treatment in a dishwasher

| | Surface treated | | |
|---|---|---|---|
| Composition added in step (ii) | S1-1 | S1-2 | S1-3 |
| Somat 3in1 tablet alone (control) | 1 | −1 | −2 |
| C1 + Somat 3in1 tablet | 1 | 1 | −1 |
| C1 | 1 | 1 | −1 |
| T1-1 | −1 | −1 | −2 |
| T1-2 | 0 | −1 | −2 |

Effective hydrophilisation of the surface is shown in the table as an increase in the score given in relation to the control.

This thus demonstrates that washing carried out in the presence of composition C1 (alone or in combination with Somat 3in1) improves the hydrophilic properties of hydrophobic surfaces.

The table also clearly shows that this effect, obtained by the combination of poly(SEP) and poly(DADMAC) in composition C1, is not obtained by either of the poly(SEP) or poly(DADMAC) polymers alone, which do not improve the hydrophilic properties of hydrophilic surfaces.

Example 2

Control of the Wettability of a Model Glass Surface with Water by Poly(SEP)- and Poly(DADMAC)-Based Compositions The three following compositions, based on a combination of poly(SEP) and poly(DADMAC), with different molar ratios were prepared:
Composition C2-1

100 g of deionised water and a magnetic stirring bar were introduced into a 250 ml plastics material container, then 0.3 g of dialysed, dry poly(SEP) with a DP of 1611 and an MW of 470 kg/mol were added. The mixture thus produced was stirred magnetically at 300 rpm for 120 minutes.

0.34 g of an aqueous solution of poly(DADMAC) (DP=2778; MW=450 kg/mol) (commercially available solution, 10% by weight, from Aldrich) were then added, and the medium was subsequently stirred at 300 rpm for 15 minutes.

In this way, a composition comprising the combination of polymers in the form of coacervates and having a DADMAC/SEP molar ratio of 0.2 (ratio of the number of DADMAC monomer units in relation to the number of SEP units added) was obtained.

Composition C2-2

100 g of deionised water and a magnetic stirring bar were introduced into a 250 ml plastics material container, then 0.3 g of dialysed, dry poly(SEP) with a DP of 1611 and an MW of 470 kg/mol were added. The mixture thus produced was stirred magnetically at 300 rpm for 120 minutes.

0.85 g of an aqueous solution of poly(DADMAC) (DP=2778; MW=450 kg/mol) (commercially available solution, 10% by weight, from Aldrich) was then added, and the medium was subsequently stirred at 300 rpm for 15 minutes.

In this way, a composition comprising the combination of polymers in the form of coacervates and having a DADMAC/SEP molar ratio of 0.5 was obtained.

Composition C2-3

100 g of deionised water and a magnetic stirring bar were introduced into a 250 ml plastics material container, then 0.3 g of dialysed, dry poly(SEP) with a DP of 1611 and an MW of 470 kg/mol were added. The mixture thus produced was stirred magnetically at 300 rpm for 120 minutes.

5.1 g of an aqueous solution of poly(DADMAC) (DP=2778; MW=450 kg/mol) (commercially available solution, 10% by weight, from Aldrich) were then added, and the medium was subsequently stirred at 300 rpm for 15 minutes.

In this way, a composition comprising the combination of polymers in the form of coacervates and having a DADMAC/SEP molar ratio of 3 was obtained.

Composition C2-4

100 g of deionised water and a magnetic stirring bar were introduced into a 250 ml plastics material container, then 0.3 g of dialysed, dry poly(SEP) with a DP of 1611 and an MW of 470 kg/mol were added. The mixture thus produced was stirred magnetically at 300 rpm for 120 minutes.

16.95 g of an aqueous solution of poly(DADMAC) (DP=2778; MW=450 kg/mol) (commercially available solution, 10% by weight, from Aldrich) were then added, and the medium was subsequently stirred at 300 rpm for 15 minutes.

In this way, a composition comprising the combination of polymers in the form of coacervates and having a DADMAC/SEP molar ratio of 10 was obtained. For comparative purposes, the following control was prepared:

Control Composition T2: Poly(SEP), without Poly(DADMAC)

100 g of deionised water and a magnetic stirring bar were introduced into a 1 litre plastics material container, then 0.3 g of dialysed, dry poly(SPP), as used in compositions C2-1 to C2-3, were added. The mixture thus produced was stirred magnetically at 300 rpm for 120 minutes.

The previously prepared compositions C2-1, C2-2, C2-3, C2-4 and T2 were used to modify the surface of an oxidised silicon wafer, which represents a model glass surface.

For this purpose, each of the compositions was diluted with water until a final polymer concentration of 25 ppm was obtained, then the compositions were brought into contact with the surface of an oxidised silicon wafer in a controlled manner in a reflectometer cell for 30 minutes. After drying the wafer treated in this way, drops of deionised water were deposited on the surface and the contact angle was measured.

The surface of the treated wafers was subsequently washed with an aqueous solution of NaCl at a concentration of 0.1% by weight, after which the contact angle of water on the surface was again measured.

The results obtained are listed in Table 2 below, which shows that the deposits produced cause the angle of contact with water (initially less than 3° for the non-treated surface) to increase, which translates as a decrease in the wettability of the surface with water, and this increases in relation to the DADMAC/SEP molar ratio, thus showing that the hydrophilic properties of a glass-type surface can be controlled by the polymer combinations according to the invention.

The table also shows that the surface treatment obtained with a poly(DADMAC)+poly(SEP) combination (compositions C2-1 to C2-3) remains stable, even after being washed with salt water, in contrast to treatment with poly(SEP) alone, which admittedly does result in an increase in the hydrophobicity of the surface, but this effect is not retained after the surface is washed with salt water (after washing, the wetting angle was found to be that of the bare initial surface).

TABLE 2

Modification of the hydrophilic properties of oxidised silicon wafers

| Composition used for surface modification | Molar ratio DADMAC/SEP | contact angle | contact angle after washing |
|---|---|---|---|
| None (control: bare surface) | — | <3° | <3° |
| T2 | 0 | 8° | <3° |
| C2-1 | 0.2 | 9° | 18° |
| C2-2 | 0.5 | 30° | 30° |
| C2-4 | 10 | 35° | 35° |

Figure 2:
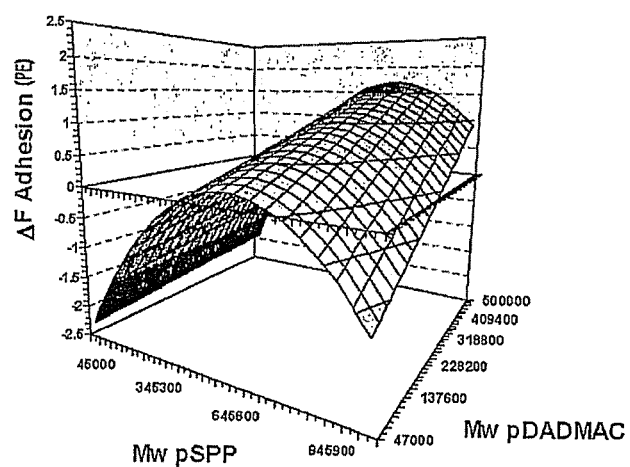
FIG. 2 shows the graph of adhesion on the polyethylene, as established for the combination of poly(SPP)−+poly(DAD-MAC)-type polymers with an SPP/DADMAC molar ratio of 5.

The surface which was modified by the C2-3 composition was viewed by atomic force microscopy (AFM) before being rinsed with the NaCl solution. FIG. 2, appended, is a photo showing a 5 μm×5 μm sample of the surface obtained (phase contrast observation). This photograph clearly shows the type of structured surface obtained by surface treatment according to the invention, comprising objects (coacervates based on the poly(DADMAC)+poly(SEP) combination) with an average diameter of approximately 20 nm.

Example 3

Promotion of Adhesion to Polyethylene Surfaces by Poly(SEP)- and Poly(DADMAC)-Based Compositions The four following compositions, based on a combination of poly(SEP) and poly(DADMAC), with different molar ratios and different DP values (and therefore different MW values) for the polymers used were prepared:

Composition C3-1

The following were added to a 400 ml plastics material container:
  1.44 g of an aqueous solution of poly(SEP) at a concentration of 41.6% by weight, with a DP of 154 and an MW of 45 kg/mol, and a magnetic stirring bar; then
  8.3 g of an aqueous solution of poly(DADMAC) (DP=285; MW=47 kg/mol) (commercially available solution, 20% by weight, from Aldrich), whilst being stirred magnetically at 300 rpm for 15 minutes; then
  390.3 g of a solution prepared by dissolving a Somat 3in1 tablet in 5 litres of water.

In this way, a composition comprising 0.56% by weight of the combination of poly(SEP) and poly(DADMAC) polymers and having a DADMAC/SEP molar ratio of 4.9 was obtained.

Composition C3-2

The following were added to a 400 ml plastics material container 11.6 g of an aqueous solution of poly(SEP) at a concentration of 28.5% by weight, with a DP of 3860 and an MW of 1000 kg/mol, and a magnetic stirring bar; then 23.0 g of an aqueous solution of poly(DADMAC) (DP=1658; MW=275 kg/mol) (commercially available solution, 20% by weight, from Aldrich), whilst being stirred magnetically at 300 rpm for 15 minutes; then 365.4 g of a solution prepared by dissolving a Somat 3in1 tablet in 5 litres of water.

In this way, a composition comprising 2.0% by weight of the combination of poly(SEP) and poly(DADMAC) polymers and having a DADMAC/SEP molar ratio of 2.5 was obtained.

Composition C3-3

The following were added to a 400 ml plastics material container 9.6 g of an aqueous solution of poly(SEP) at a concentration of 41.6% by weight, with a DP of 154 and an MW of 45 kg/mol, and a magnetic stirring bar; then 55.35 g of an aqueous solution of poly(DADMAC) (DP=285; MW=47 kg/mol) (commercially available solution, 20% by weight, from Aldrich), whilst being stirred magnetically at 300 rpm for 15 minutes; then 335.05 g of a solution prepared by dissolving a Somat 3in1 tablet in 5 litres of water.

In this way, a composition comprising 3.8% by weight of the combination of poly(SEP) and poly(DADMAC) polymers and having a DADMAC/SEP molar ratio of 4.9 was obtained.

Composition C3-4

The following were added to a 400 ml plastics material container 28.8 g of an aqueous solution of poly(SEP) at a concentration of 41.6% by weight, with a DP of 154 and an MW of 45 kg/mol, and a magnetic stirring bar; then 1.66 g of an aqueous solution of poly(DADMAC) (DP=2778; MW=450 kg/mol) (commercially available solution, 20% by weight, from Aldrich), whilst being stirred magnetically at 300 rpm for 15 minutes; then 369.5 g of a solution prepared by dissolving a Somat 3 in1 tablet in 5 litres of water.

In this way, a composition comprising 3.1% by weight of the combination of poly(SEP) and poly(DADMAC) polymers and having a DADMAC/SEP molar ratio of 0.05 was obtained.

Each of the compositions C3-1 to C3-4 was then used to modify the surface of 100 mm×50 mm² polyethylene samples, by immersing said samples in 400 ml of the composition for 45 minutes at 65° C., then rinsing the samples 10 times with 400 ml of water, then drying them at 23° C. under controlled humidity (50% relative humidity).

A peeling test was carried out to quantify the adhesion of the compositions to the surface. For this purpose, a strip of adhesive tape from imeMed Labeling Systems was laid over the entire length (100 mm) of the polyethylene sample tested, and a 2 kg metal roller from E.T.S. Holland was rolled over the adhesive tape 5 times, for 20 seconds each time. The tape was the peeled off at an angle of 90° at a controlled speed v by using a DY30 ADAMEL Lhomargy machine provided with a 100 N sensor: a peeling force $F(l_{tape}, v)$, dependent on v, was measured as a function of the length of the peeled tape $l_{tape}$ until a plateau value $F_{plateau}(v)$, corresponding to the force required to peel off the tape, was reached. $F_{plateau}(v)$ was measured at speeds v of 20, 50 and 100 mm/min respectively, and a force $F_{plateau}(v=0)$, denoted as $F_{plateau}^0$, was extrapolated for the valve v=0, which represented the theoretical force required to peel the tape at zero speed in thermodynamic conditions.

For comparative purposes, the experiment was also carried out on similar polyethylene samples which had not been treated, and the relative excess of the adhesive force E, corresponding to the following ratio, was calculated:

$$E=(F_{plateau}^0(\text{non-treated})-F_{plateau}^0(\text{treated}))/F_{plateau}^0(\text{non-treated})$$

When this value is negative, the force required to peel the strip off is greater than that required to peel the strip off without treatment, that is to say, the treatment has promoted adhesion. Conversely, a positive ratio indicates treatment which has a negative impact on adhesion.

The method which has been described for Example 3 may be used generally to test the effect on adhesion for any of the polymer combinations according to the invention on any surface.

The results obtained for the current example are given in Table 3 below, which shows negative relative excesses E, thus indicating promotion of adhesion.

TABLE 3

Promotion of adhesion to polyethylene surfaces

| Composition used | poly(SEP) DP | poly(DADMAC) DP | Polymer concentration (by weight) | DADMAC/SEP molar ratio | E |
|---|---|---|---|---|---|
| C3-1 | 154 | 285 | 0.56% | 4.9 | −12% |
| C3-2 | 3860 | 1658 | 2.0% | 2.5 | −22% |
| C3-3 | 154 | 285 | 3.8% | 4.9 | −18% |
| C3-4 | 154 | 2778 | 3.1% | 0.05 | −10% |

Example 4

Reduction of Adhesion to Polyethylene Surfaces by Poly(SEP)- and Poly(DADMAC)-Based Compositions The four following compositions, based on a combination of poly(SEP) and poly(DADMAC), with different molar ratios and different DP values (and therefore different MW values) for the polymers used were prepared:

Composition C4-1

The following were added to a 400 ml plastics material container 27.2 g of an aqueous solution of poly(SEP) at a concentration of 24.3% by weight, with a DP of 1868 and an MW of 545 kg/mol, and a magnetic stirring bar; then 0.915 g of an aqueous solution of poly(DADMAC) (DP=1658; MW=275 kg/mol) (commercially available solution, 20% by weight, from Aldrich), whilst being stirred magnetically at 300 rpm for 15 minutes; then 371.9 g of a solution prepared by dissolving a Somat 3in1 tablet in 5 litres of water.

In this way, a composition comprising 1.70% by weight of the combination of poly(SEP) and poly(DADMAC) polymers and having a DADMAC/SEP molar ratio of 0.05 was obtained.

Composition C4-2

The following were added to a 400 ml plastics material container 28.8 g of an aqueous solution of poly(SEP) at a concentration of 41.6% by weight, with a DP of 154 and an MW of 45 kg/mol, and a magnetic stirring bar; then 1.66 g of an aqueous solution of poly(DADMAC) (DP=285; MW=47 kg/mol) (commercially available solution, 20% by weight, from Aldrich), whilst being stirred magnetically at 300 rpm for 15 minutes; then 369.5 g of a solution prepared by dissolving a Somat 3in1 tablet in 5 litres of water.

In this way, a composition comprising 3.1% by weight of the combination of poly(SEP) and poly(DADMAC) polymers and having a DADMAC/SEP molar ratio of 0.05 was obtained.

Composition C4-3

The following were added to a 400 ml plastics material container 24.7 g of an aqueous solution of poly(SEP) at a concentration of 24.3% by weight, with a DP of 1868 and an MW of 545 kg/mol, and a magnetic stirring bar; then 41.9 g of an aqueous solution of poly(DADMAC) (DP=1658; MW=275 kg/mol) (commercially available solution, 20% by weight, from Aldrich), whilst being stirred magnetically at 300 rpm for 15 minutes; then 333.4 g of a solution prepared by dissolving a Somat 3in1 tablet in 5 litres of water.

In this way, a composition comprising 3.6% by weight of the combination of poly(SEP) and poly(DADMAC) polymers and having a DADMAC/SEP molar ratio of 2.47 was obtained.

Composition C4-4

The following were added to a 400 ml plastics material container 2.11 g of an aqueous solution of poly(SEP) at a concentration of 28.5% by weight, with a DP of 3860 and an MW of 1000 kg/mol, and a magnetic stirring bar; then 8.3 g of an aqueous solution of poly(DADMAC) (DP=2778; MW=450 kg/mol) (commercially available solution, 20% by weight, from Aldrich), whilst being stirred magnetically at 300 rpm for 15 minutes; then 389.6 g of a solution prepared by dissolving a Somat 3in1 tablet in 5 litres of water.

In this way, a composition comprising 0.565% by weight of the combination of poly(SEP) and poly(DADMAC) polymers and having a DADMAC/SEP molar ratio of 4.9 was obtained.

As in Example 3, each of the compositions C4-1 to C4-4 was then used to modify the surface of 100 mm×50 mm$^2$ polyethylene samples, and the relative excesses E of the adhesive force were measured and are given in Table 4 below, which shows positive relative excesses E, thus indicating a reduction in adhesion.

TABLE 4

Reduction of adhesion to polyethylene surfaces

| Composition used | poly(SEP) DP | poly(DADMAC) DP | Polymer concentration (by weight) | DADMAC/SEP molar ratio | E |
|---|---|---|---|---|---|
| C4-1 | 1868 | 1658 | 1.7% | 0.05 | +15% |
| C4-2 | 154 | 285 | 3.1% | 0.05 | +12% |
| C4-3 | 1868 | 1658 | 3.6% | 2.47 | +38% |
| C4-4 | 3860 | 2778 | 0.565% | 4.9 | +66% |

Example 5

Promotion of Adhesion to Glass Surfaces by Poly(SEP)- and Poly(DADMAC)-Based Compositions The four following compositions, based on a combination of poly(SEP) and poly(DADMAC), with different molar ratios and different DP values (and therefore different MW values) for the polymers used were prepared:

Composition C5-1

The following were added to a 400 ml plastics material container 5.8 g of an aqueous solution of poly(SEP) at a concentration of 41.6% by weight, with a DP of 154 and an MW of 45 kg/mol, and a magnetic stirring bar; then 0.33 g of an aqueous solution of poly(DADMAC) (DP=2778; MW=450 kg/mol) (commercially available solution, 20% by weight, from Aldrich), whilst being stirred magnetically at 300 rpm for 15 minutes; then 393.9 g of a solution prepared by dissolving a Somat 3in1 tablet in 5 litres of water.

In this way, a composition comprising 0.6% by weight of the combination of poly(SEP) and poly(DADMAC) polymers and having a DADMAC/SEP molar ratio of 0.05 was obtained.

Composition C5-2

The following were added to a 400 ml plastics material container 2.9 g of an aqueous solution of poly(SEP) at a concentration of 41.6% by weight, with a DP of 154 and an MW of 45 kg/mol, and a magnetic stirring bar; then 0.16 g of an aqueous solution of poly(DADMAC) (DP=285; MW=47 kg/mol) (commercially available solution, 20% by weight, from Aldrich), whilst being stirred magnetically at 300 rpm for 15 minutes; then 396.9 g of a solution prepared by dissolving a Somat 3in1 tablet in 5 litres of water.

In this way, a composition comprising 0.3% by weight of the combination of poly(SEP) and poly(DADMAC) polymers and having a DADMAC/SEP molar ratio of 0.05 was obtained.

Composition C5-3

The following were added to a 400 ml plastics material container 9.6 g of an aqueous solution of poly(SEP) at a concentration of 41.6% by weight, with a DP of 154 and an MW of 45 kg/mol, and a magnetic stirring bar; then 55.35 g of an aqueous solution of poly(DADMAC) (DP=285; MW=47 kg/mol) (commercially available solution, 20% by weight, from Aldrich), whilst being stirred magnetically at 300 rpm for 15 minutes; then 335.05 g of a solution prepared by dissolving a Somat 3in1 tablet in 5 litres of water.

In this way, a composition comprising 3.8% by weight of the combination of poly(SEP) and poly(DADMAC) polymers and having a DADMAC/SEP molar ratio of 4.9 was obtained.

Composition C5-4

The following were added to a 400 ml plastics material container 4.2 g of an aqueous solution of poly(SEP) at a concentration of 28.5% by weight, with a DP of 3860 and an MW=1000 kg/mol, and a magnetic stirring bar; then 0.33 g of an aqueous solution of poly(DADMAC) (DP=2778; MW=450 kg/mol) (commercially available solution, 20% by weight, from Aldrich), whilst being stirred magnetically at 300 rpm for 15 minutes; then 335.05 g of a sohltion prepared by dissolving a Somat 3 in1 tablet in 5 litres of water.

In this way, a composition comprising 0.3% by weight of the combination of poly(SEP) and poly(DADMAC) polymers and having a DADMAC/SEP molar ratio of 0.1 was obtained.

In a similar manner to Examples 3 and 4, each of the compositions C5-1 to C5-4 was then used to modify a surface, of glass this time, and the relative excesses E of the adhesive force were measured and are given in Table 5 below, which shows negative relative excesses E, thus indicating improved adhesion.

TABLE 5 promotion of adhesion to glass surfaces

| Composition used | poly(SEP) DP | poly(DADMAC) DP | Polymer concentration (by weight) | DADMAC/SEP molar ratio | E |
|---|---|---|---|---|---|
| C5-1 | 154 | 2778 | 0.6% | 0.05 | −33% |
| C5-2 | 154 | 285 | 0.3% | 0.05 | −20% |
| C5-3 | 154 | 285 | 3.8% | 4.9 | −27% |
| C5-4 | 3860 | 2778 | 0.3% | 0.1 | −32% |

Example 6

Reduction in Adhesion to Glass Surfaces by Poly(SEP)- and Poly(DADMAC)-Based Compositions The four following compositions, based on a combination of poly(SEP) and poly(DADMAC), with different molar ratios and different DP values (and therefore different MW values) for the polymers used were prepared:

Composition C6-1

The following were added to a 400 ml plastics material container 24.7 g of an aqueous solution of poly(SEP) at a concentration of 24.3% by weight, with a DP of 1868 and an MW of 545 kg/mol, and a magnetic stirring bar; then 41.9 g of an aqueous solution of poly(DADMAC) (DP=1658; MW=275 kg/mol) (commercially available solution, 20% by weight, from Aldrich), whilst being stirred magnetically at 300 rpm for 15 minutes; then 333.4 g of a solution prepared by dissolving a Somat 3in1 tablet in 5 litres of water.

In this way, a composition comprising 3.6% by weight of the combination of poly(SEP) and poly(DADMAC) polymers and having a DADMAC/SEP molar ratio of 2.5 was obtained.

Composition C6-2

The following were added to a 400 ml plastics material container 9.6 g of an aqueous solution of poly(SEP) at a concentration of 41.6% by weight, with a DP of 154 and an MW of 45 kg/mol, and a magnetic stirring bar; then 41.9 g of an aqueous solution of poly(DADMAC) (DP=2778; MW=450 kg/mol) (commercially available solution, 20% by weight, from Aldrich), whilst being stirred magnetically at 300 rpm for 15 minutes; then 333.4 g of a solution prepared by dissolving a Somat 3 in1 tablet in 5 litres of water.

In this way, a composition comprising 3.8% by weight of the combination of poly(SEP) and poly(DADMAC) polymers and having a DADMAC/SEP molar ratio of 3.7 was obtained.

Composition C6-3

The following were added to a 400 ml plastics material container 28.8 g of an aqueous solution of poly(SEP) at a concentration of 41.6% by weight, with a DP of 154 and an MW of 45 kg/mol, and a magnetic stirring bar; then 1.66 g of an aqueous solution of poly(DADMAC) (DP=285; MW=47 kg/mol) (commercially available solution, 20% by weight, from Aldrich), whilst being stirred magnetically at 300 rpm for 15 minutes; then 369.5 g of a solution prepared by dissolving a Somat 3 in1 tablet in 5 litres of water.

In this way, a composition comprising 3.1% by weight of the combination of poly(SEP) and poly(DADMAC) polymers and having a DADMAC/SEP molar ratio of 0.05 was obtained.

Composition C6-4

The following were added to a 400 ml plastics material container 2.1 μg of an aqueous solution of poly(SEP) at a concentration of 28.5% by weight, with a DP of 3860 and an MW of 1000 kg/mol, and a magnetic stirring bar; then 8.3 g of an aqueous solution of poly(DADMAC) (DP=2778; MW=450 kg/mol) (commercially available solution, 20% by weight, from Aldrich), whilst being stirred magnetically at 300 rpm for 15 minutes; then 389.6 g of a solution prepared by dissolving a Somat 3 in1 tablet in 5 litres of water.

In this way, a composition comprising 0.565% by weight of the combination of poly(SEP) and poly(DADMAC) polymers and having a DADMAC/SEP molar ratio of 4.9 was obtained.

As in Example 5, each of the compositions C6-1 to C6-4 was then used to modify glass surfaces, and the relative excesses E of the adhesive force were measured and are given in Table 6 below, which shows positive relative excesses E, thus indicating a reduction in adhesion.

TABLE 6

Reduction in adhesion to glass surfaces

| Composition used | poly(SEP) DP | poly(DADMAC) DP | Polymer concentration (by weight) | DADMAC/SEP molar ratio | E |
|---|---|---|---|---|---|
| C6-1 | 1868 | 1658 | 3.6% | 2.5 | +93% |
| C6-2 | 154 | 2778 | 3.8% | 3.7 | +99% |
| C6-3 | 154 | 285 | 3.1% | 0.05 | +27% |
| C6-4 | 3860 | 2778 | 0.565% | 4.9 | +42% |

Example 7

Promotion of Wettability of Aluminium Surfaces by Poly(SEP)- and Poly(DADMAC)-Based Compositions Composition C7 below, based on a combination of poly(SEP) and poly(DADMAC), was prepared:

Composition C7

The following were added to a 400 ml plastics material container
  5 litres of water, in which a Somat 3in1 tablet was dissolved; then
  24.7 g of an aqueous solution of poly(SEP) at a concentration of 24.3% by weight, with a DP of 1868 and an MW of 545 kg/mol, and a magnetic stirring bar; then
  41.9 g of an aqueous solution of poly(DADMAC) (DP=1658; MW=275 kg/mol) (commercially available solution, 20% by weight, from Aldrich), whilst being stirred magnetically at 300 rpm for 15 minutes; then
  333.4 g of a solution prepared by dissolving a Somat 3in1 tablet in 5 litres of water.

In this way, a composition comprising the combination of poly(SEP) and poly(DADMAC) polymers and having a DADMAC/SEP molar ratio of 3 was obtained.

Aluminium plates were treated with the composition C7 obtained, by immersing said plates in 5 litres of the composition for 45 minutes at 65° C., then removing them from the composition and allowing them to dry at room temperature. Drops of water were then deposited on the surface and the contact angle was measured, which was 14° in contrast to 80° for the non-treated aluminium surface, and this indicates an overall improvement in wettability by water after treatment.

Example 8

Promotion of Wettability of Plastics Material Surfaces with Water by Composition C8, Based on Poly(SPP), Poly(DADMAC) and Poly(Sodium Acrylate)

Drying in an Automatic Dishwasher
Preparation of Composition C8
The following stock solutions were used:
poly(SPP), DP=154, 2% weight concentration, pH=2.
poly(DADMAC), DP=1698, (Aldrich, MW=275000), 5% weight concentration, pH=5.
poly(sodium acrylate), DP=22, (Aldrich, MW=2100), 2.5% weight concentration, pH=8.

96.25 g of deionised water and a magnetic stirring bar were introduced into a 0.5 litre plastics material container, then 17.56 g of the poly(SPP) stock solution were added. The mixture thus produced was stirred magnetically at 300 rpm for 5 minutes.

2.72 g of the poly(DADMAC) stock solution were then added, and the medium was subsequently stirred at 300 rpm for 5 minutes.

0.52 g of the poly(sodium acrylate) stock solution were then added, and the medium was subsequently stirred at 300 rpm for 5 minutes.

In this way, a composition comprising the combination of polymers in the form of coacervates was obtained.

Modification of the Wettability of Plastics Material Surfaces, and Driving in a Dish Washer The three following plastics material surfaces S8-1, S8-2 and S8-3 were tested (materials commonly found in domestic use):
  S8-1: poly(propylene) plate
  S8-2: poly(ethylene) plate
  S8-3: styrene-acrylonitrile (SAN) box These surfaces were subjected to different treatments in a Miele Prima automatic dishwasher, the treatments comprising the following two steps (i) and (ii) in each case:
  (i) the tested surface, initially non-treated, was first prewashed in the dishwasher with a washing cycle comprising:
    washing at 50° C. with a washing solution with a high pH, comprising, by weight: 63.8% of sodium tripolyphosphate (STPP); 35% of Simet AG; 0.6% of antarox B79R and 0.6% of antarox B12DF; then
    rinsing with citric acid and purified water; then
    washing with the detergent sold under the name "Somat 3in1";
  then
  (ii) the surface which was prewashed in this way was subjected to a second complete washing cycle in a Miele Prima dishwasher (50° C. cycle), and, at the beginning of the washing stage at 50° C., one of the compositions listed in Table 7 below was added (Calgonit 5 in 1, sold in France by Reckitt&Benckiser, with or without preparation C8 described above)

The surfaces were examined upon completion of each treatment. Whether or not the surfaces seemed dry, and thus the way water acted on the surface obtained, was assessed in accordance with the following evaluation scale from −2 to +2:
  (−2): surface is very hydrophobic, water droplets run down the surface
  (−1): surface is hydrophobic, water droplets adhere to the surface (0): surface is neutral, there are traces of water which contract rapidly
(+1): surface is hydrophilic, a film of water forms and contracts rapidly
(+2): surface is very hydrophilic, an entire film of water forms, without contraction.

The results observed are provided in Table 7 below.

TABLE 7

| Treatment in a dishwasher | | | |
|---|---|---|---|
| | Surface treated | | |
| Composition added in step (ii) | S8-1 | S8-2 | S8-3 |
| Calgonit 5 in 1 tablet alone (control) | −2 | −2 | −1 |
| C8 + Calgonit 5 in 1 tablet | −2/−1 | 0/+1 | +2 |

Effective hydrophilisation of the surface is shown in the table as an increase in the score given in relation to the control.

This thus demonstrates that washing carried out in the presence of composition C8 considerably improves the hydrophilic properties of the hydrophobic surfaces S8-2 and S8-3, and slightly improves the hydrophilic properties of the hydrophobic surface S8-1.

The invention claimed is:

1. A method for modifying the surface properties of a solid material substrate, said method comprising depositing onto the face surface(s) thereof, a composition comprising:
   at least one polymer (PZ) containing zwitterionic structural units; and
   at least one other polymer (P), different from said polymer (PZ), carrying charged substituents and capable of bonding with said at least one first polymer (PZ), wherein said charged substituents react with the zwitterionic structural units of the polymer (PZ).

2. The method for modifying the surface properties of a solid material substrate as defined by claim 1, wherein the composition further comprises a solvent and the concentration by weight of the total of said at least one polymer (PZ) and at least one other polymer (P) is from 1 ppm to 100,000 ppm.

3. The method for modifying the surface properties of a solid material substrate as defined by claim 1, wherein the treated surface(s) of the solid material substrate comprises a polymer, glass or metal.

4. The method for modifying the surface properties of a solid material substrate as defined by claim 1, wherein the zwitterionic structural units present in the at least one polymer (PZ) comprise:
   (i) at least one group (G⁻) having a negative charge, at least under the surface treatment conditions; and
   (ii) at least one group (G⁺) having a positive charge, at least under the surface treatment conditions,
and wherein said groups (G⁻) and (G⁺) are carried by a pendant chain comprising said zwitterionic structural units.

5. The method for modifying the surface properties of a solid material substrate as defined by claim 1, wherein the at least one polymer (PZ) comprises zwitterionic structural units which comprise, as a pendant chain, at least one monovalent group selected from the group consisting of:
   monovalent nitrogenous zwitterionic groups corresponding to the following general formulae $(GZ_N^1)$ to $(GZ_N^6)$:

  $(GZ_N^1)$

  $(GZ_N^2)$

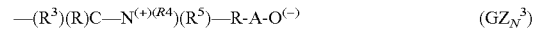  $(GZ_N^3)$

  $(GZ_N^4)$

  $(GZ_N^5)$

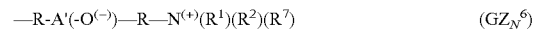  $(GZ_N^6)$ monovalent phosphoriferous zwitterionic groups corresponding to the following general formulae $(GZ_P^1)$ and $(GZ_P^2)$:

  $(GZ_P^1)$

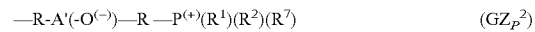  $(GZ_P^2)$ and, monovalent sulphurous zwitterionic groups corresponding to the following general formulae $(GZ_S^1)$ and $(GZ_S^2)$:

  $(GZ_S^1)$

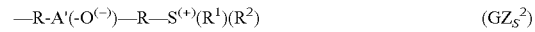  $(GZ_S^2)$ wherein the groups in the formulae $(GZ_N^1)$ to $(GZ_N^6)$, $(GZ_P^1)$, $(GZ_P^2)$, $(GZ_S^1)$ and $(GZ_S^2)$ have the following definitions:

R is a linear or branched alkylene radical having from 1 to 15 carbon atoms, optionally substituted by one or more hydroxy groups or a benzylene radical;

$R^1$, $R^2$, $R^5$ and $R^7$, which may be identical or different, are each an alkyl radical having from 1 to 7 carbon atoms;

$R^3$ and $R^4$ are hydrocarbon radicals forming, with the nitrogen atom, a nitrogenous heterocycle optionally comprising one or more other heteroatoms;

$R^6$ is a hydrocarbon radical forming, with the nitrogen atom, a saturated or unsaturated nitrogenous heterocycle optionally comprising one or more other heteroatoms;

A represents an S(=O)(=O), OP(=O)(O), OP(=O)(OR'), P(=O)OR' or P(=O)(R') divalent radical, in which R' is an alkyl radical having from 1 to 7 carbon atoms or a phenyl radical;

A' represents the divalent radical —O—P(=O)—O—; and $W^{(-)}$ represents an ethenolate functional group corresponding to one of the following formulae:

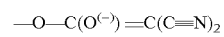

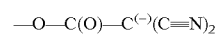

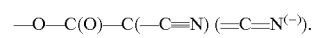

6. The method for modifying the surface properties of a solid material substrate as defined by claim 5, wherein the at least one polymer (PZ) comprises a polyzwitterionic polymer selected from the group consisting of:

homopolymers or copolymers formed by a chain of betaine units comprising pendant groups corresponding to the formula $(GZ_N^1)$ in which A is an S(=O)(=O) group;

homopolymers of sulphobetaine derived from 2-vinylpyridine, of the following formula:

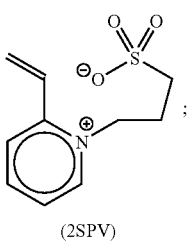

(2SPV)

and
mixtures of said polymers.

7. The method for modifying the surface properties of a solid material substrate as defined by claim 5, wherein the at least one polymer (PZ$^{(+)-}$) comprises zwitterionic groups corresponding to the formulae (GZ$_N^1$), (GZ$_N^2$), (GZ$_N^3$), (GZ$_N^4$), (GZ$_N^5$), (GZ$_P^1$) and/or (GZ$_S^1$).

8. The method for modifying the surface properties of a solid material substrate as defined by claim 1, wherein, in the at least one polymer (PZ), the molar ratio (zwitterionic structural units/total polymer units) is at least equal to 50%.

9. The method for modifying the surface properties of a solid material substrate as defined by claim 1, wherein the at least one polymer (PZ) comprises a polyzwitterionic polymer selected from the group consisting of homopolymers or copolymers formed by a chain of betaine structural units corresponding to the following formulae (-SPE-) and (-SPP-):

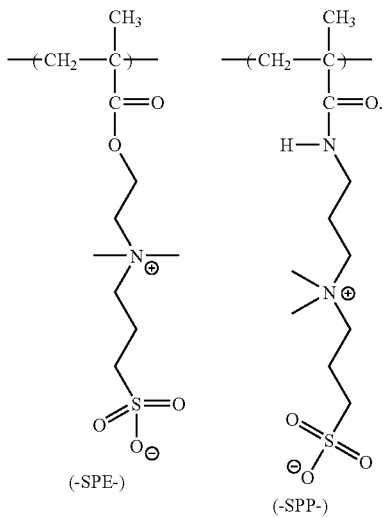

10. The method for modifying the surface properties of a solid material substrate as defined by claim 1, wherein:

the at least one polymer (PZ) comprises a polymer (PZ$^{(+)-}$) in which the zwitterionic structural units carry anionic groups which are more available than the cationic groups; and
the at least one polymer (P) comprises a cationic polymer (P$^+$) carrying optionally-terminal cationic groups.

11. The method for modifying the surface properties of a solid material substrate as defined by claim 1, wherein:

the at least one polymer (PZ) comprises a polymer (PZ$^{(-)+}$) in which the zwitterionic structural units carry cationic groups which are more available than the anionic groups; and
the at least one polymer (P) comprises an anionic polymer (P) carrying optionally-terminal anionic groups.

12. The method for modifying the surface properties of a solid material substrate as defined by claim 5, wherein the at least one polymer (PZ$^{(+)-}$) comprises zwitterionic groups corresponding to the formulae (GZ$_N^6$), (GZ$_P^2$) and/or (GZ$_S^2$).

13. The method for modifying the surface properties of a solid material substrate as defined by claim 1, wherein the ratio of the quantity of charged units carried by the at least one polymer (P) in relation to the amount of zwitterionic units carried by the at least one polymer (PZ) ranges from 0.1 to 10.

14. The method for modifying the surface properties of a solid material substrate as defined by claim 1, wherein the combination of polymers (PZ) and (P) comprises an active ingredient that is finally fixed on the treated surface(s).

15. The method as defined by claim 1 further comprising:
at least one sulphobetaine or carboxybetaine zwitterionic polymer (PZ), the total charge of this polymer being zero or other than zero; and
at least one cationic polymer (P$^+$).

16. The method as defined by claim 1 further comprising:
at least one phosphobetaine zwitterionic polymer (PZ), the total charge of this polymer being zero; and
at least one anionic polymer (P$^-$).

17. The method for modifying the surface properties of a solid material substrate as defined by claim 1 further comprising:
at least one phosphobetaine zwitterionic polymer (PZ), the total charge of this polymer being zero;
at least one cationic polymer (P$^+$), and
at least one anionic polymer (P$^-$).

18. The method of claim 1, wherein the polymers (PZ) and (P) form are combined together in the form of a coacervate.

19. A method for modifying the surface properties of a solid material substrate, said method comprising depositing onto the face surface(s) thereof, a composition comprising:
at least one polymer (PZ) containing zwitterionic structural units; and
at least one other polymer (P), different from said polymer (PZ), carrying charged substituents and capable of bonding with said at least one first polymer (PZ), wherein said polymer (P) is a cationic polymer or an anionic polymer.

* * * * *